United States Patent [19]

Kase et al.

[11] Patent Number: 4,949,328

[45] Date of Patent: Aug. 14, 1990

[54] DISK PLAYER FOR PLAYING BOTH SIDES OF A DISK OR MULTIPLE DISKS WITHOUT EJECTION THEREOF AND A DISK PLAYER WITH A DISK BEING PLAYED THAT OVERLAPS DISKS STORED IN A STORAGE RECEPTOR

[75] Inventors: Masao Kase; Toshiaki Koizumi; Masatsugu Otaki; Masakazu Yamashita; Kenji Tanaka; Ryo Matsuura, all of Saitama, Japan

[73] Assignee: Pioneer Electronic Corporation, Tokyo, Japan

[21] Appl. No.: 231,637

[22] Filed: Aug. 10, 1988

Related U.S. Application Data

[62] Division of Ser. No. 7,157,193, Feb. 18, 1988, abandoned.

[30] Foreign Application Priority Data

Feb. 18, 1987 [JP] Japan .............................. 62-22549[U]
May 27, 1987 [JP] Japan ............................ 62-130752[U]

[51] Int. Cl.$^5$ ....................... G11B 17/04; G11B 1/00; G11B 3/62
[52] U.S. Cl. .................................. 369/75.2; 369/195; 369/199; 369/264
[58] Field of Search ...................... 369/75.2, 195, 199, 369/264, 244

[56] References Cited

U.S. PATENT DOCUMENTS

| | | | |
|---|---|---|---|
| 2,891,797 | 6/1959 | Hull et al. | 369/195 |
| 3,131,936 | 5/1964 | Hagen | 369/39 |
| 3,246,899 | 4/1966 | Bodenroder | 369/39 |
| 3,432,171 | 3/1969 | Foufounis | 369/199 |
| 4,170,030 | 10/1979 | Castrodale et al. | 369/38 |
| 4,387,452 | 6/1983 | Bricot et al. | 369/199 |
| 4,594,700 | 6/1986 | Takahashi et al. | 369/39 |
| 4,697,259 | 9/1987 | Takanashi | 369/75.2 |
| 4,715,025 | 12/1987 | Eijelmans | 369/75.2 |
| 4,771,416 | 9/1988 | Ishibashi et al. | 369/199 |
| 4,787,074 | 11/1988 | Deck et al. | 369/195 |

FOREIGN PATENT DOCUMENTS 57169936 10/1982 Japan .

*Primary Examiner*—Steven L. Stephan
*Attorney, Agent, or Firm*—Sughrue, Mion, Zinn, Macpeak & Seas

[57] ABSTRACT

A front loading type disk player which can play both sides of a single disk without ejecting the disk from and reinserting it into the disk player after playing one side. In addition, the disk player can play one or both sides of multiple disks without ejecting or reinserting disks. The disk player includes a movable carrier on which at least two trays are movably mounted. The carrier can be moved in a first direction so as to project from or retract into a housing of the disk player, and the trays can be moved in the first direction with respect to the carrier and a second, vertical direction e.g. perpendicular to the first direction. The trays are moved by moving a chassis, which supports them, with respect to the carrier. The trays are independently movable in the first direction and the chassis 11 is movable in the vertical direction in a stepwise fashion so that the disks stored on the trays can be properly individually placed on the turntable and removed therefrom. In addition, there is a disk player for receiving multiple disks and selectively playing the received disks. The disks are received and stored in a vertical stack in a disk receptor, and a disk to be played is placed on a turntable.

27 Claims, 27 Drawing Sheets

FIG. 13(b)
FIG. 13(a)
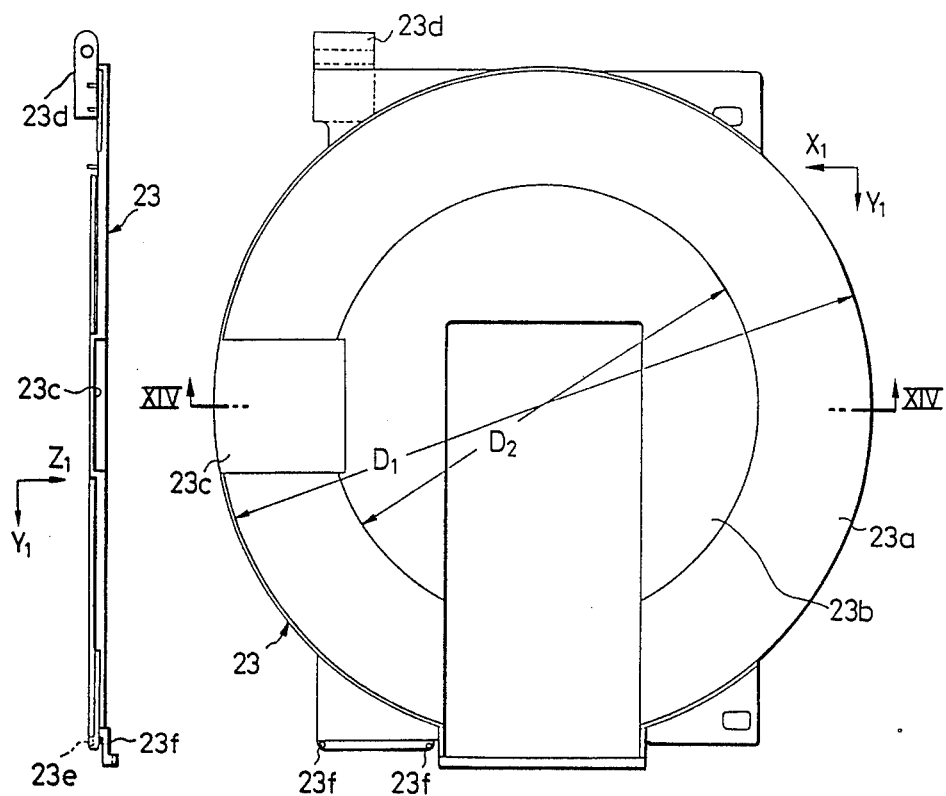
FIG. 13(c)
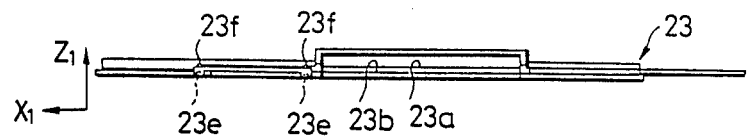

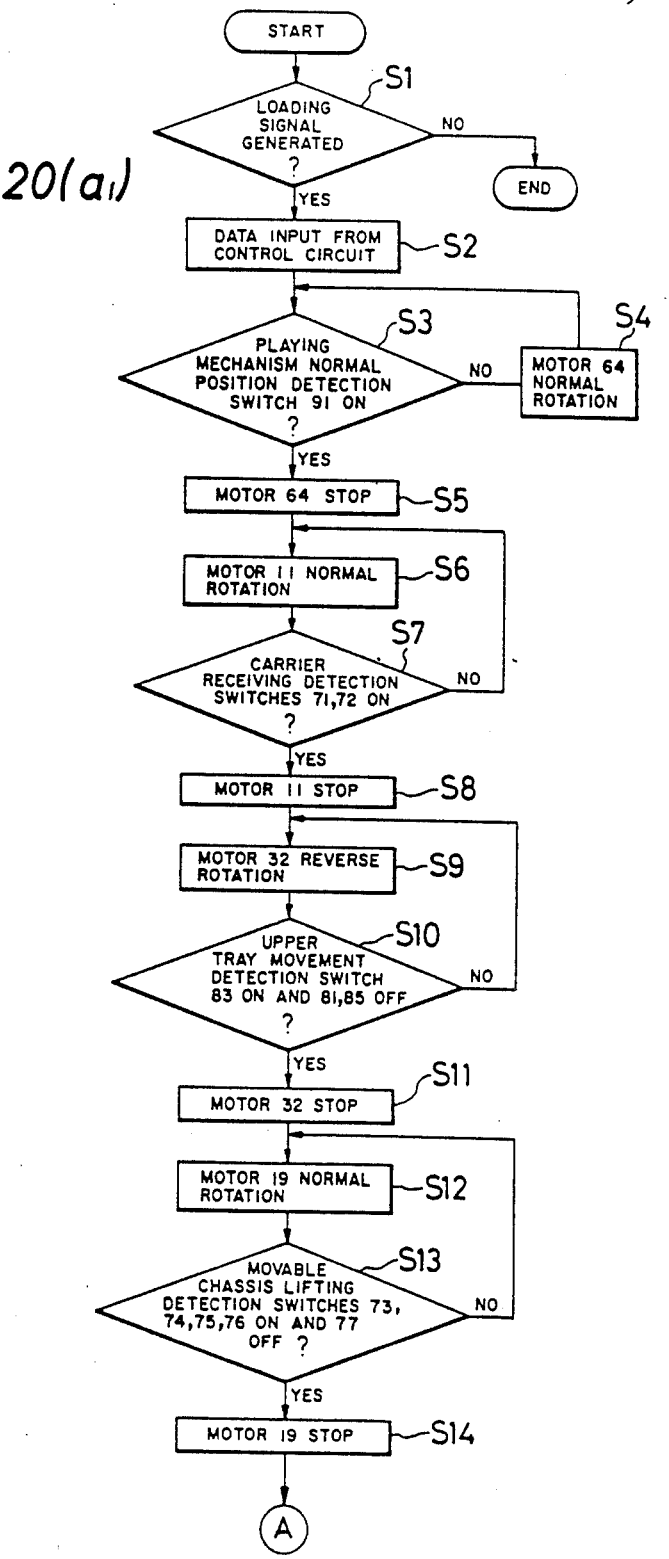
FIG. 20(a₁)

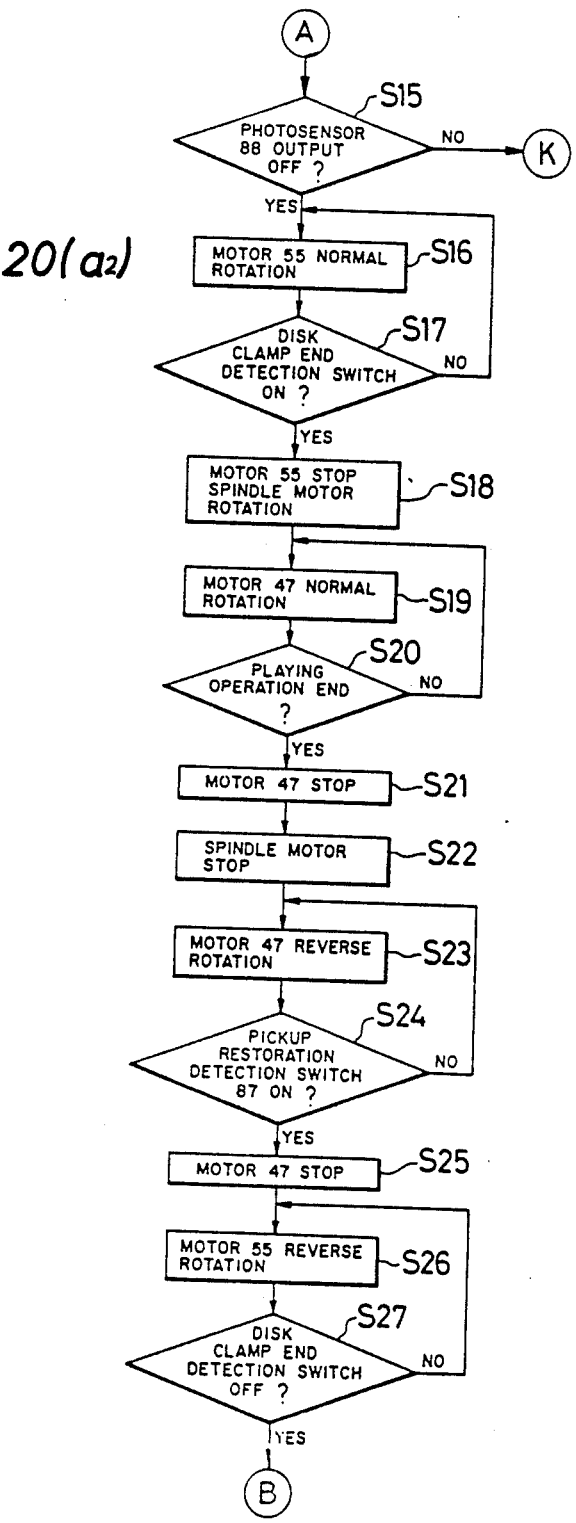
FIG. 20(a₂)

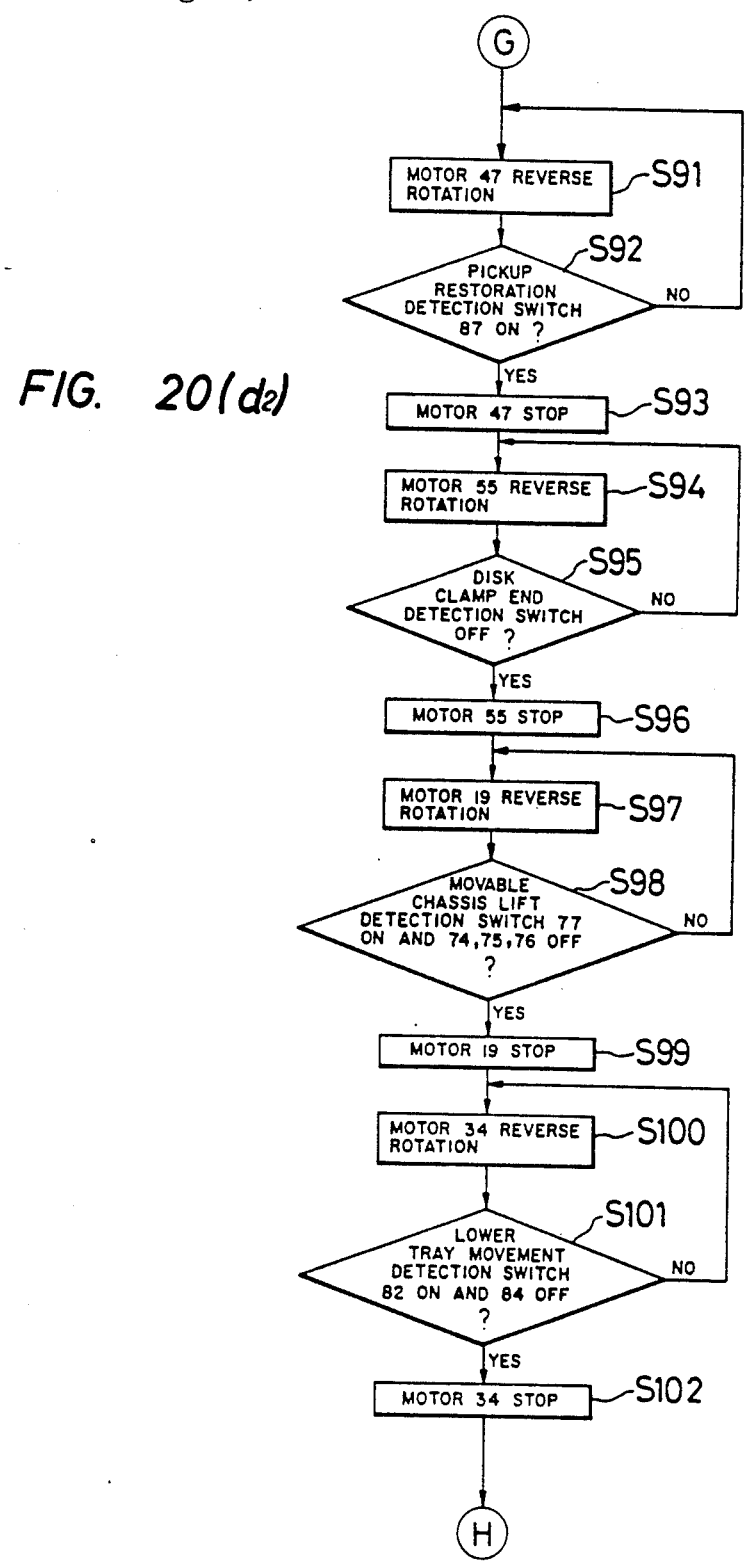
FIG. 20(d₂)

DISK PLAYER FOR PLAYING BOTH SIDES OF A DISK OR MULTIPLE DISKS WITHOUT EJECTION THEREOF AND A DISK PLAYER WITH A DISK BEING PLAYED THAT OVERLAPS DISKS STORED IN A STORAGE RECEPTOR

This is a Division of application Ser. No. 07/157,193 filed 2/18/188 and now abandoned.

BACKGROUND OF THE INVENTION

The present invention relates to a disk player. More specifically, it relates to a front loading disk player and to a disk player for receiving a plurality of disks and sequentially selecting desired ones of the disks for play.

In a front loading type disk player, it has been proposed that when positioning a disk to be played in the playing position, namely transferring the disk onto the turntable by moving it from outside of a housing for the disk player, the disk is transferred in a first direction which is parallel to the disk holding plane of the turntable and in a second direction which is almost at a right angle to the disk holding plane. As indicated in FIG. 1, in such a proposed front loading type disk player, a carrier 102 freely moves in a first direction (direction of arrow $X_1$ and its reverse direction) between a projected position outside of a housing 101 and a retracted position within the housing. A tray 104, for holding a disk 103, is mounted on the carrier for movement in a second direction (direction of arrow $Z_1$ and its reverse direction) with respect to the carrier. The disk player also includes a carrier drive means (not illustrated) which moves the carrier and a tray drive means (not illustrated) which moves the tray with respect to the carrier.

In operation, the disk 103 is placed on the tray 104 when the carrier 102 protrudes outside of the housing 101. Thereafter, the disk is set on the turntable 105 by moving the carrier 102 to the retracted position and the tray 104 is then lowered toward the turntable 105 so that the disk is placed on the turntable. Moreover, the disk can be returned, after the playing operation, by operations reverse to those described above.

The above-described front loading type disk player receives a single disk and conducts the playing operation for a single side of the disk and therefore inconveniences users because it requires repeated eject operations and loading operations to invert or replace a disk in order to play both sides of a disk or to play multiple disks.

Moreover, proposed disk players for receiving a plurality of disks and playing them are bulky. Such a disk player is shown in FIGS. 2–3. A housing 201 is formed as a whole like a rectangular parallel piped and a disk receptor 203, which receives a plurality of disks 202 at respective disk receiving planes and arranges the disks sequentially and coaxially with a predetermined pitch, is provided on one side of the housing. A base member 204 for holding the disk receptor 203 is disposed at a lower part of the housing 201 and a turntable 205 is mounted on the base member. A carriage 206 holding a pickup is disposed between the disk receptor 203 and the turntable 205 and is fixed to the base member 204 through a guide shaft 207 so that the carriage can move along the recording plane of the disk 202 when placed on the turntable 205.

A clamper 208 (FIG. 3) presses and fixes the disk 202 to the disk holding plane of the turntable 205 and it can be attached to or removed from the disk by a mechanism which is not illustrated in FIGS. 1 and 2. A disk transfer mechanism (not illustrated) is also provided to sequentially select a desired disk from the disks 202 stored in the disk receptor 203 and then transfer the disk to the playing position, namely onto the turntable 205. The disk transfer mechanism holds the desired disk in the disk receptor 203 and then places it on the turntable 205 by moving the disk relative to the turntable in two directions. One direction is parallel to the disk receiving plane of the disk receptor (direction of arrow $X_2$) and the other is in a vertically downward direction (direction of arrow $Z_2$). Moreover, the disk 202 can also be returned to the disk receptor 203 from the turntable 205 by transfer in reverse directions to the directions $X_1$ and $Z_2$.

As is obvious from FIG. 2, the disk player has a separation distance of $D+e_1$ between the center of each disk 202 stored in the disk receptor 3 and the rotational center axis of turntable 205, where D is the diameter of the disk and $e_1$ is the clearance in the horizontal plane (defined by arrows $X_2$ and $Y_2$) provided between the disk on the disk receptor 203 and the disk on the turntable. Therefore, width $B_1$ e of the housing 1 is equal to a value $2D+e_1+\alpha 1+\alpha_2$, which expression is obtained by adding $2\times D/2+\alpha_1+\alpha_2$ to the separation distance $D+e_1$, where $\alpha_1$ and $\alpha_2$ indicate an allowable size for separation between the disk 202 and the internal surface of the housing 1.

SUMMARY OF THE INVENTION

It is an object of the present invention to provide a front loading type disk player which overcomes the above-mentioned deficiencies of the above-described disk player. More specifically, it is an object of the invention to achieve a front loading type disk player which can play both sides of a disk or a plurality of disks without performing an eject operation or repeated loading operations, while minimizing any increase in size of the disk player as a whole.

According to the present invention, the front loading type disk player is characterized in that the tray, which is provided on the carrier so as to be freely movable in the first above-specified direction with respect to the housing as well as the second above-specified direction. That is, the tray is freely movable in the two above-specified directions with the two directions being, for example, at right angles to each other.

It s also an object of the present invention to provide a disk player which is formed small in size as a whole and particularly small in the width dimension.

The disk player of the present invention is characterized in that the disks in the receptor and on the turntable are partly overlapped, and the disk on the turntable is played under this condition. Means for moving the turntable in opposite directions which are parallel to a central axis of the disks stored in the receptor are also provided.

BRIEF DESCRIPTION OF THE DRAWINGS

FIG. 11(a) to FIG. 14 are detailed views of a part of the internal structure of the disk player of FIG. 4;

DETAILED DESCRIPTION OF THE PREFERRED EMBODIMENTS

A front loading type disk player as an embodiment of the present invention is explained with reference to the accompanying drawings.

Figure 4:
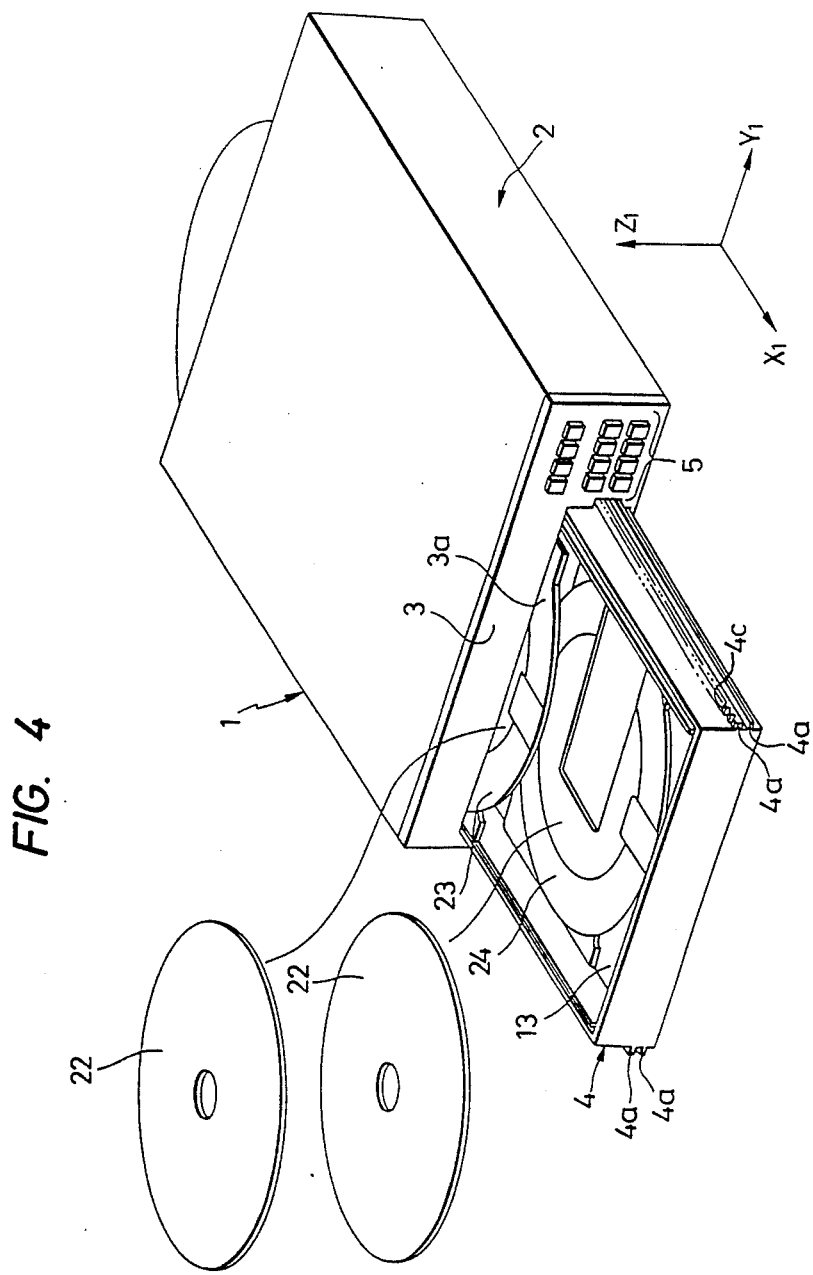
FIG. 4 is a perspective view of a front loading type disk player as a whole in an embodiment of the present invention.

In FIG. 4, reference number 1 denotes the front loading type disk player.

Carrier:

The disk player 1 has a housing 2 with a front panel 3 which forms a front surface of the housing. The front panel 3 has a rectangular opening 3a which extends to the right and left sides so that a carrier 4 can protrude outside of the housing therethrough, where the right-to-left direction with respect to the housing is indicated by the arrow $Y_1$ and the direction (front direction) in which the carrier 4 protrudes corresponds to arrow $X_1$. Moreover, arrow $Z_1$ indicates an upward direction. At the left side of opening 3a, a keyboard 5 is provided for controlling operation of the disk player.

Figure 5:
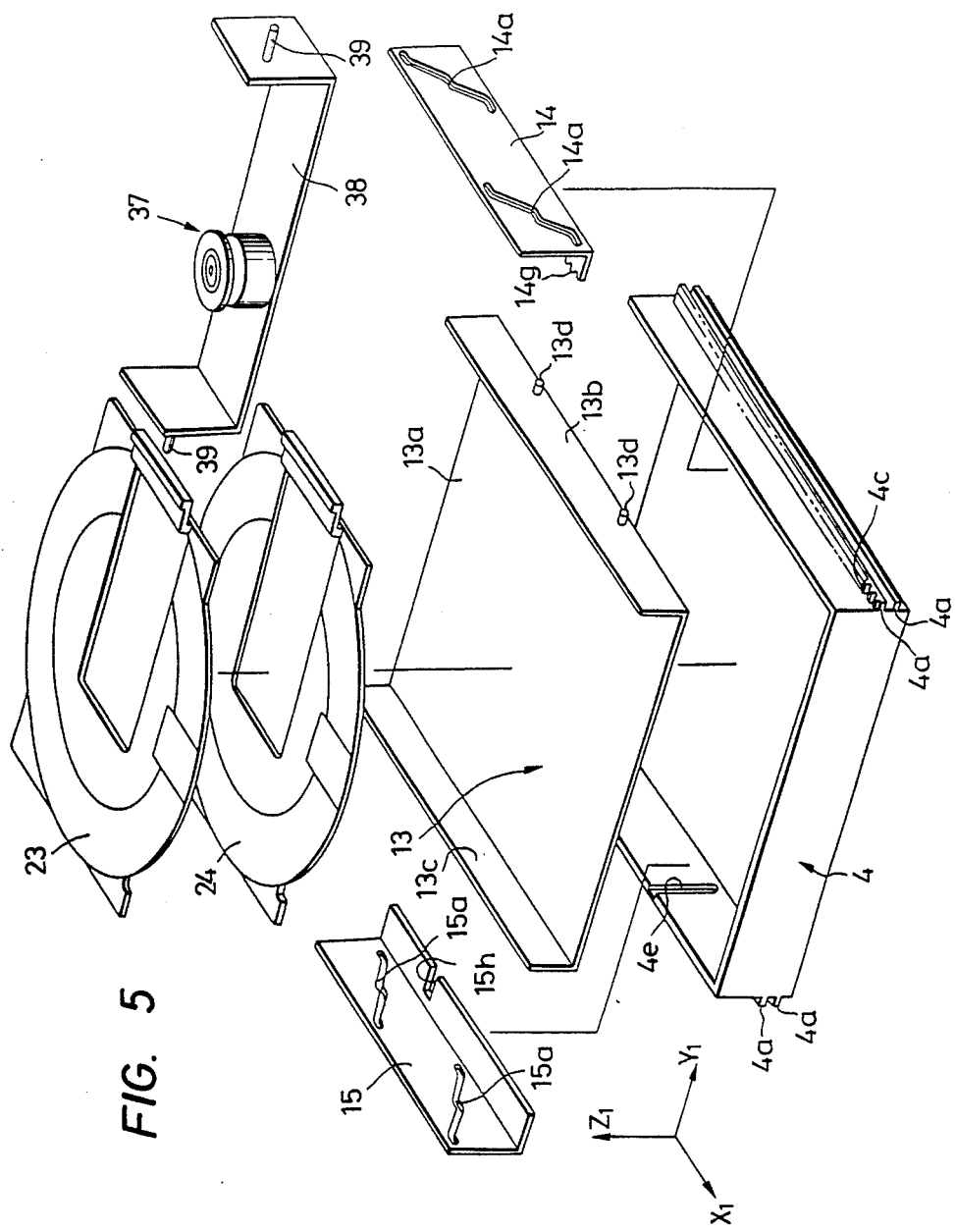
FIG. 5 is a perspective view of principal members of internal structure of the front loading type disk player of FIG. 4.
Figure 6:
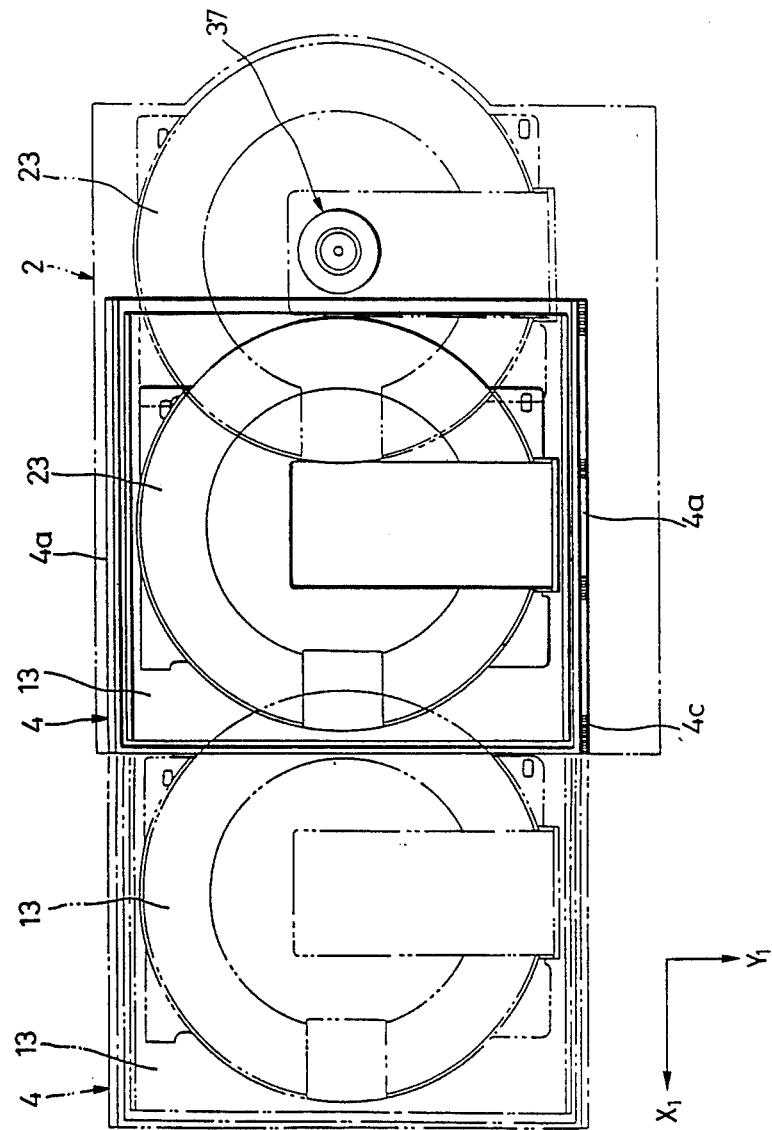
FIG. 6 is an outline in plan view of such internal structure of the disk player of FIG. 4.
Figure 7:
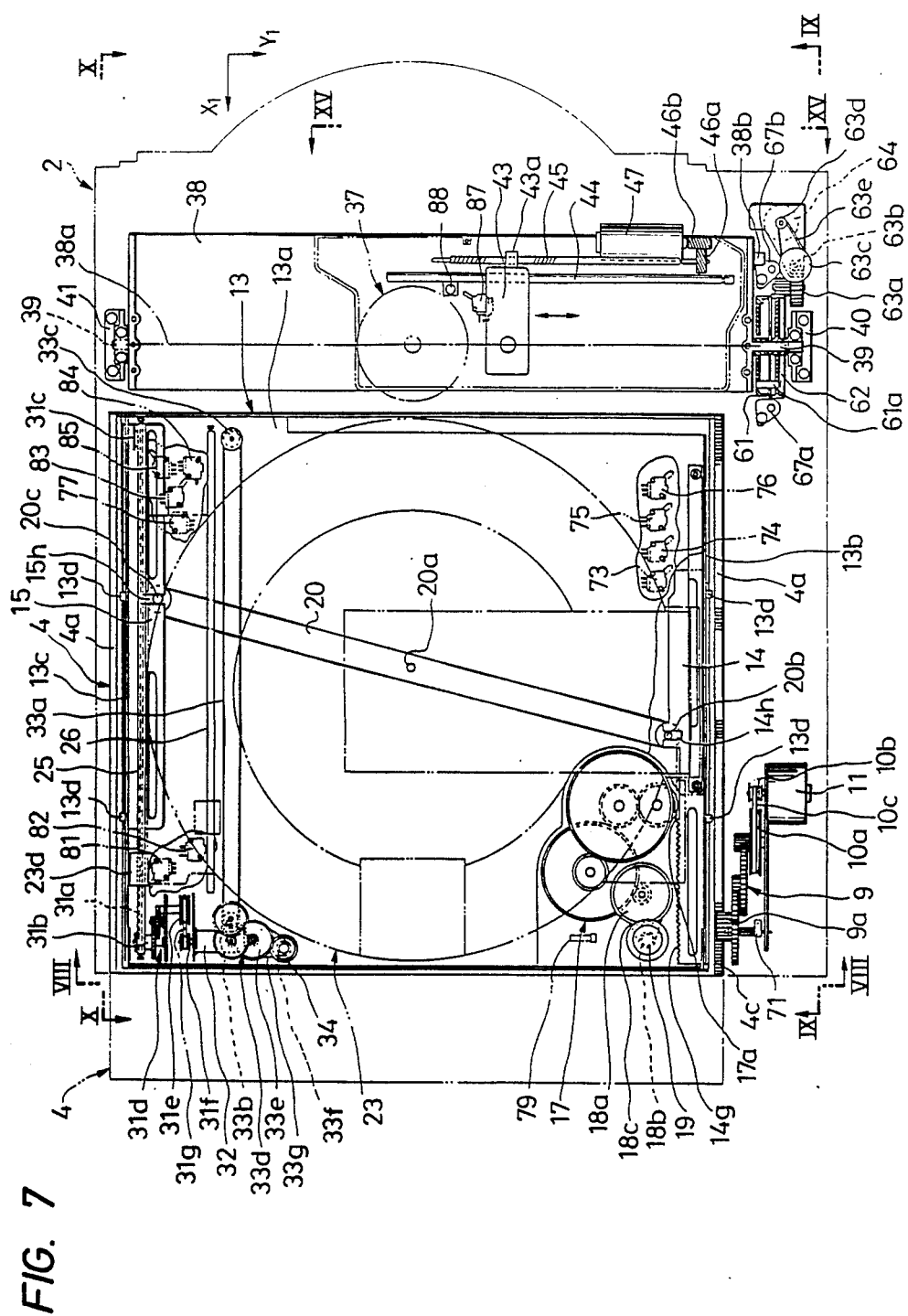
FIG. 7 is a plan view including a partial sectional view of internal structure of the disk player of FIG. 4.
Figure 8:
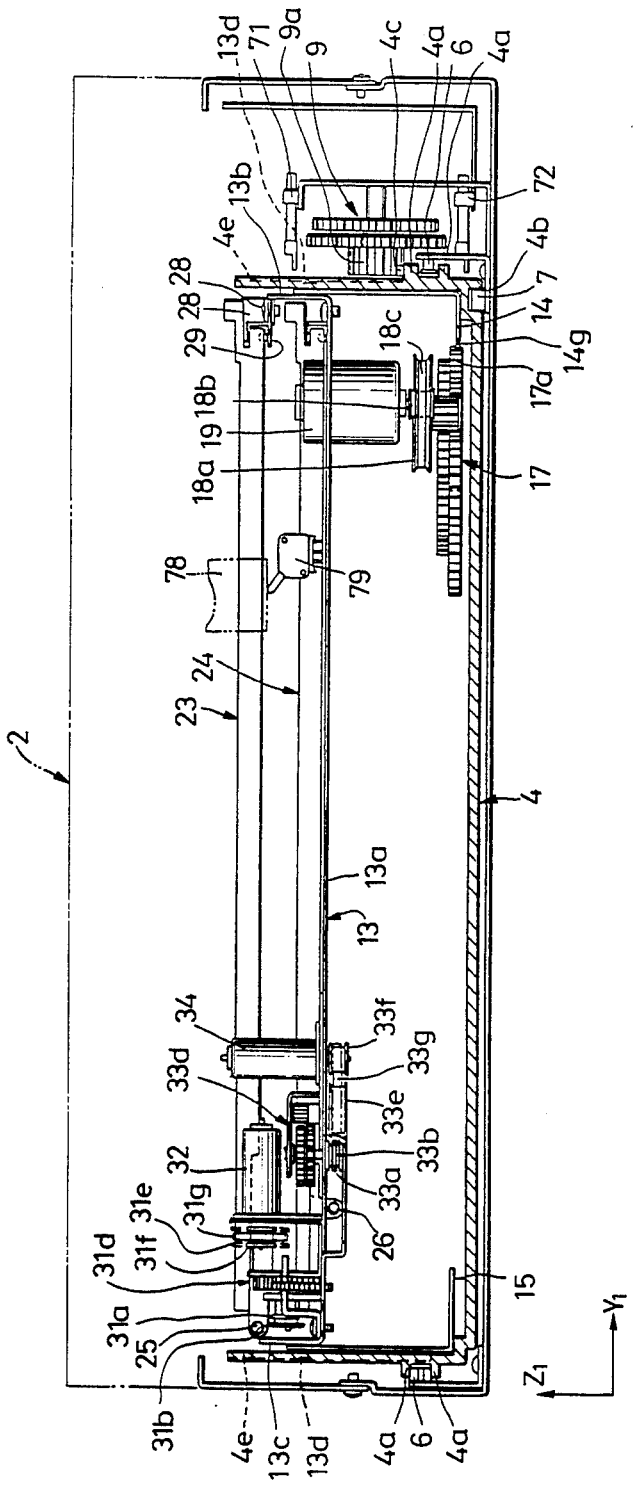
FIGS. 8–10 are sectional views along the lines VIII—VIII, IX—IX and X—X of FIG. 7.
Figure 9:
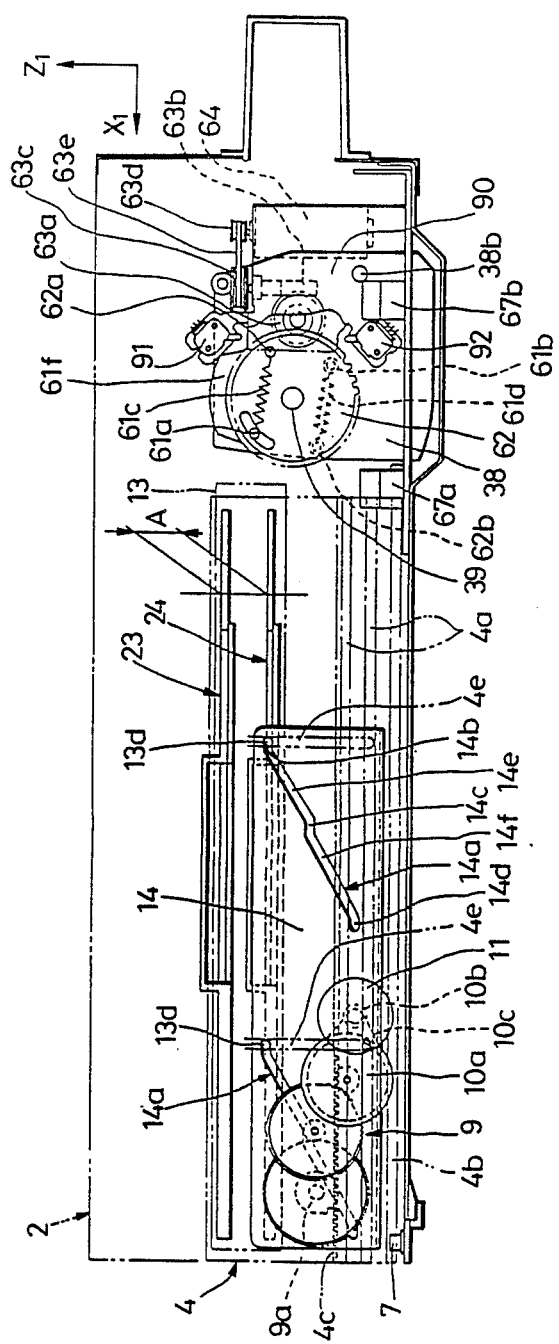

With reference to FIG. 5, the carrier 4 is formed like a rectangular parrallelopiped with an open upper side and an open rear side. As respectively indicated by a solid line and chain line in FIG. 6, the carrier 4 freely moves in the front and rear directions (direction of the arrow $X_1$ and its reverse direction) which corresponds to the first specified direction and its reverse direction between the retracted position and the protruded position of the carrier 4 with respect to the housing 2. In detail, as indicated in FIGS. 7 and 9, four longitudinal projected portions 4a, that is, two portions on the right side and two portions on the left side of the carrier 4, are formed so as to extend in the front and rear directions. As indicated in FIG. 8, guide rollers 6 are disposed so as to be sandwiched by the longitudinal projected portions 4a. In addition, with reference to FIGS. 8 and 9, a groove 4b is formed at the left, lower side of the carrier 4 and extends in the moving direction of the carrier 4 for the full length of the carrier. A column type guide member 7 fixed to the housing 2 is slidably engaged with the groove 4b. Thereby, the carrier 4 is guided in the front and rear direction with high accuracy without swaying to the right and left.

A rack 4c extends almost the full length of the left side longitudinal projected portions among two longitudinal projected portions 4a formed at the left side of the carrier. With reference to FIGS. 7 and 8, the rack 4c is engaged with a gear 9a and the carrier 4 is moved by a motor 11 through a gear reduction mechanism 9 including the gear 9a corresponding to a final stage gear, geared belt wheels 10a. 10b and a geared belt 10c. A carrier drive means which moves the carrier is formed by the gear reduction mechanism 9, geared belt wheels 10a, 10b, geared belt 10c and motor 11.

Chassis:

Referring to FIGS. 4–5, a movable chassis 13 is provided in the carrier 4 to be movable therewith. The movable chassis 13 is composed of a horizontal plate 13a extending in the front and rear direction (direction of arrow $Y_1$ and its reverse direction) and in the right-to-left direction and vertical plates 13b, 13c respectively disposed at left and right sides of the horizontal plate and extending continuously upwardly. With reference to FIGS. 5. 7 and 10, a pair of movable members 14 and 15, extending in the front and rear directions, are provided at the external surface of the left and right vertical plates 13b and 13c of the chassis 13 for reciprocal movement in the front and rear directions. Details of the movable members 14. 15 are shown in FIGS. 11(a) to 11(c) and FIGS. 12(a) to 12(c).

Referring back to FIGS. 5. 7 and 10, the vertical plates 13b, 13c are each provided with two pins 13d, i.e. four pins 13d are implanted in the chassis 13. These pins 13d are slidably engaged with guide grooves 4e formed at the right and left side walls of the carrier 4 so as to extend in the vertical direction (direction of the arrow $Z_1$ and its reverse direction) and thereby the chassis 13 can be guided in the vertical direction.

The four pins 13d are slidably engaged not only with the guide grooves 4e but also with cam grooves 14a, 15a respectively formed in the movable members 14 and 15. The cam groove 14a is formed, as a whole, in such a way as to incline downward toward the front side. The cam groove 15a is formed, as a whole, in such a way as to incline upward toward the front side. Thus, the cam grooves 14a, 15a are formed so that when the movable members 14 and 15 move relatively, the chassis 13 moves step-wise vertically.

The cam grooves 14a and 15a are respectively formed by three short linear portions 14b, 14c, 14d and 15b, 15c, 15d extending in the moving direction (front and rear directions) of the movable members 14, 15 and by two inclined portions 14e, 14f and 15e, 15f connected to the linear portions and inclined with respect thereto. As a whole, the cam groove portions are formed like a staircase. Therefore, the chassis 13 intermittently moves up or down the two steps depending upon the movement of the movable members 14, 15.

As shown in FIG. 5, 7, 8, 11(a) and 11(c), a rack part 14g is formed on the movable member 14 so as to extend along the moving direction. As shown in FIGS. 7 and 8, the rack portion 14g is engaged with the final gear 17a of the gear reduction mechanism 17 provided on the carrier 4. The movable member 14 is given a drive force by a drive force creation and transfer mechanism consisting of the gear reduction mechanism 17, geared belt wheels 18a, 18b, geared belt 18c and motor 19.

As shown in FIG. 7, a rotational lever 20, which is rotatably provided at the center of the carrier 4 through a rotational supporting shaft 20a extending in the vertical direction, is provided between the movable members 14 and 15. Pins 20b, 20c are implanted in parallel with the rotational supporting shaft 20a at both ends of the rotational lever and are smoothly engaged with cut-out portions 14h, 15h respectively formed in the members 14 and 15.

Trays:

On the chassis 13, two sheets or trays 23, 24 which are capable of holding a disk 22 (FIG. 4) are provided so as to overlap when viewed from above and so as to have a predetermined clearance in the vertical direction. The trays are mounted in the chassis such that movement of the chassis in the vertical direction moves the trays a corresponding amount.

Figure 14:
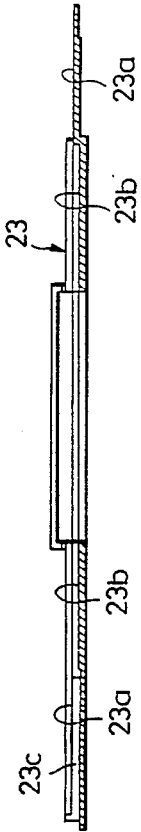

FIGS. 13(a) to (c) and FIG. 14 show details of the tray 23. FIG. 14 is a sectional view along the line XIV—XIV of FIG. 13(a).

The tray 23 has a first disk supporting surface 23a with diameter $D_1$ for supporting a disk 22 having a diameter of about 30 cm and a second disk supporting surface 23b with diameter $D_2$ for supporting a smaller disk (not illustrated) having a diameter of about 20 cm. The first and second disk supporting surfaces are concentric. As best shown in FIG. 14, the second disk supporting surface 23b is formed as a recessed part of the tray 23 and has a depth which is deeper than the thickness of a disk to be placed on the first disk supporting surface 23a. At the front end portion of the tray 23, a recessed part 23c is formed so that a user can insert a finger under the disk in order to remove it from either of the first and second disk supporting surfaces 23a, 23b. It is natural that the depth of the recessed part 23c from the first disk supporting surface 23a is deeper than the depth of the second disk supporting surface. It is not necessary to form the tray with both disk supporting surfaces.

The tray 24 is formed similar to the tray 23, so it is not explained here in detail.

Figure 10:
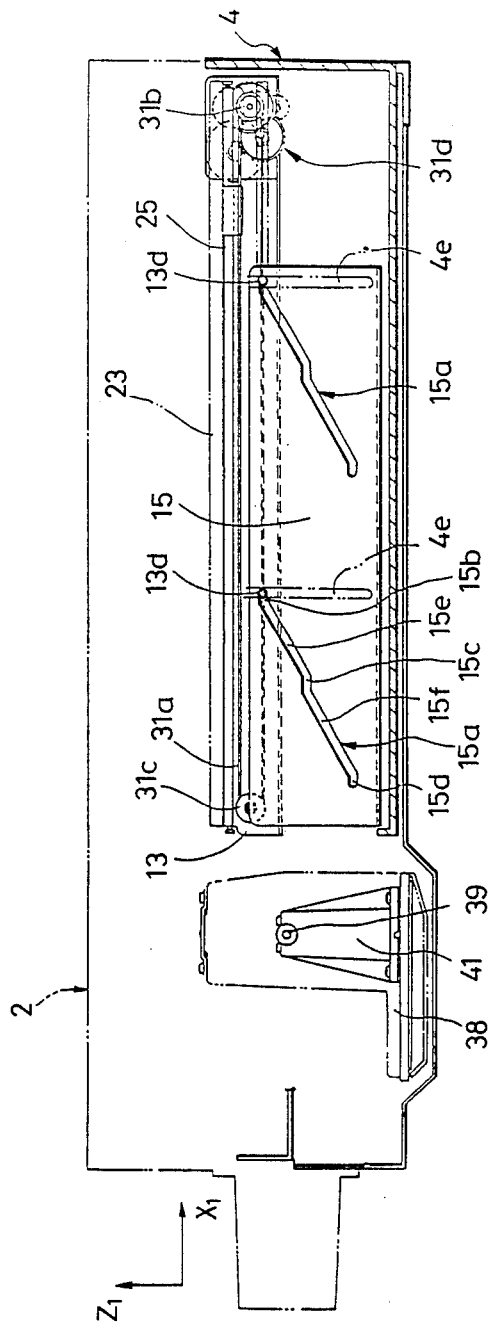
Figure 11C:
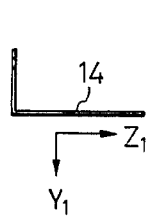
Figure 11A:
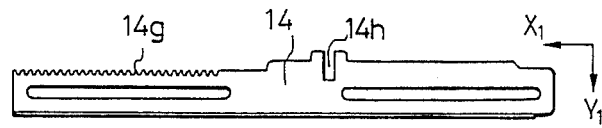
Figure 11B:
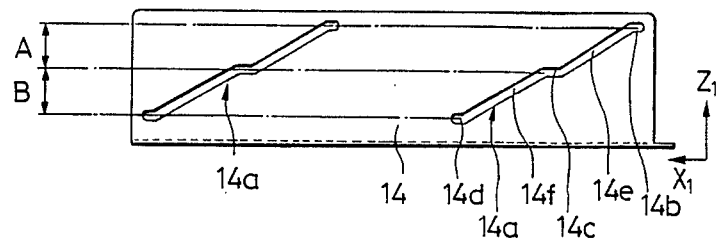
Figure 12A:
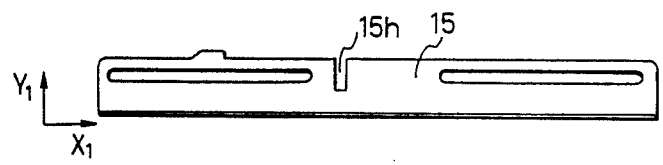
Figure 12C:
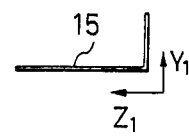
Figure 12B:
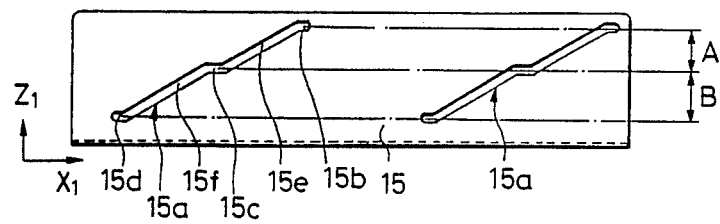

The trays 23 and 24 explained above move in the front and rear directions with the carrier and in the vertical direction with the chassis. The trays 23 and 24 also move independently of each other, and the carrier and chassis, in the front and rear directions. As shown in FIGS. 5, 7 and 10, the right side end portions of the trays 23, 24 are respectively slidably engaged with each of two guide shafts 25 and 26 provided extending in the front and rear directions at a right side portion of the chassis 13. In addition, as shown in FIG. 8, left side end portions of the trays 24, 25 are slidably engaged with a guide member 28 and a guide plate 29 provided on the chassis 13. With such structure, the trays 23 and 24 are smoothly guided in the front and rear directions. As shown in FIGS. 13(a) to (c), the tray 23 is provided with a block 23d which slidably engages with the guide shaft 25 and a steel ball 23e and semi-spherical projection 23f which are slidably in contact with the guide member 28 and guide plate 29. The tray 24 is also provided with a similar block, steel ball and semi-spherical projection.

Referring now to FIGS. 7, 8 and 10, the right side end portion of the chassis 13 is provided with a pair of pulleys 31b and 31c around which a wire 31a is extended. The wire 31a is connected with the tray 23. The pulley 31b is given a rotating force from a motor 32 through a gear reduction mechanism 31d, geared belt wheels 31e, 31f and a geared belt 31g. Namely, with normal and reverse rotation of the motor 32, the tray 23 reciprocally moves in the front and rear directions. Similarly, as shown in FIGS. 7 and 8, a wire 33a, pulleys 33b, 33c, a gear reduction mechanism 33d, geared belt wheels 33e, 33f, a geared belt 33g and a motor 34 are provided in order to cause the tray 24 to make the same reciprocal movement.

A first tray drive mechanism, which moves the trays 23, 24 in the front and rear directions, is formed by the wires 31a, 33a, pulleys 31b, 31c, 33b, 33c, gear reduction mechanisms 31d, 33d, geared belt wheels 31e, 31f, 33e, 33f, geared belts 31g, 33g, and motors 32, 34. As shown in FIG. 6, the trays 23, 24 move between a first position just above the carrier 4 and a second position projected to the rear side of the carrier 4.

Moreover, a disk transfer mechanism which holds the disk 22 to be played and transfers it to a playing position within the housing 2 is constituted by the first tray drive mechanism, a second tray drive mechanism, the trays 23, 24 and carrier 4. The second tray drive mechanism, for moving the trays in a vertical direction, is formed by the drive force creation and transfer mechanism which is in turn formed by the chassis 13, movable members 14, 15, rotational lever 20 and motor 19 for giving a drive force to the movable member 14 and the peripheral small elements associated therewith.

As explained previously, the trays 23, 24 are provided on the carrier 4 which moves between two positions, the projected position and the disk receiving position within the housing, with respect to the front and rear directions and the trays move with the carrier and can also move independently thereof between the first and second positions mentioned above. Therefore, as can readily be determined from FIG. 6, the playing position can be easily set at a remaining position at the deepest area of the housing 2.

Figure 15:
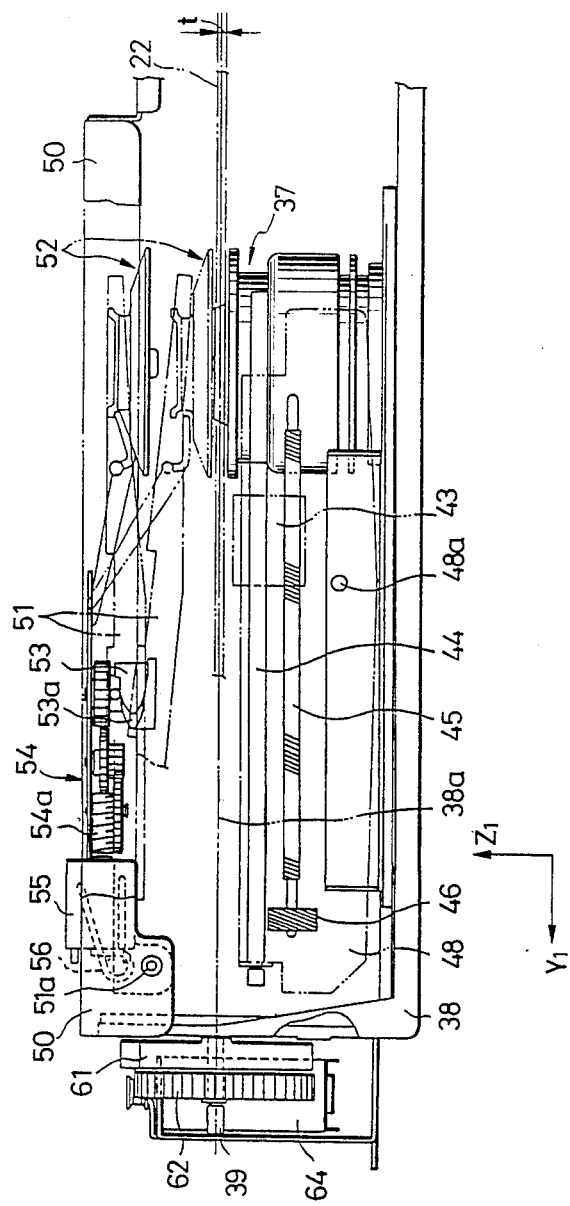
FIG. 15 is a sectional view along the line XV—XV of FIG. 7.

Playing mechanism:

As shown in FIGS. 2, 5–7, 9–10 and 15, a turntable 37 is arranged at the deepest area of the housing 2 and the turntable is supported by a supporting member 38 extending in the right and left directions. A rotational supporting shaft 39 extending in the right to left direction is provided at the right and left side ends of the supporting member 38 and is rotatably supported by a pair of bearings 40 and 41 fixed to the housing 2. As indicated in FIGS. 7 and 15, a carriage 43 supporting an optical pickup mechanism is arranged on the supporting member 38 and is fixed movable in this case in the right and left directions along the plane parallel to the disk supporting surface of the turntable 37 through a guide shaft 44, but is otherwise fixed to the member 38. Moreover, a carriage drive mechanism for moving the carriage 43 is formed by a worm 45 which is screwed to a half nut 43a (FIG. 7) provided on the carriage 43, a worm shell 46a to give a rotating force to the worm 45, a worm 46b and a motor 47 to create the moving force. In addition, the carriage 43, guide shaft 44, worm 45 and motor 47 are provided on a swaying plate 48 (FIG. 15) which is mounted on the supporting member 38 through a pin 48a for a swaying (rotating) motion. The swaying plate 48 sways in a plane at a right angle to the disk supporting surface of the turntable 37. A drive source is provided to sway the swaying plate. With such structure, a tilt servo function can be realized.

As also shown in FIG. 15, a longitudinal bracket 50 is provided on the supporting member 38 in parallel with the supporting member. An arm member 51 is rotatably attached to the bracket 50 by means of a pin 51a at one end and the free end of the arm member as a disk type pressing member 52 rotatably attached thereto. The pressing member 52 presses the disk carried to the playing position toward the turntable 37 thus functioning as a disk clamper. The longitudinal bracket 50 is provided with a rotatable cam member 53 having a helical cam surface 53e which is engaged with the arm member 51. Therefore, rotation of the cam member 53 causes the arm member 51 to sway forward, thereby attaching the pressing member 52 to and removing it from the turntable 37. The cam member 53 is rotatably driven by a motor 55 through a gear reduction mechanism 54 including a worm 54a. Moreover, a spring member 56 biases the arm member 51 toward the turntable 37.

A disk clamping mechanism is thus formed by the arm member 51, pressing member 52, cam member 53, gear reduction mechanism 54, motor 55 and spring member 56. A disk playing mechanism is constituted by the disk clamping mechanism, turntable 37, optical pickup mechanism and tilt servo mechanism.

Figure 17:
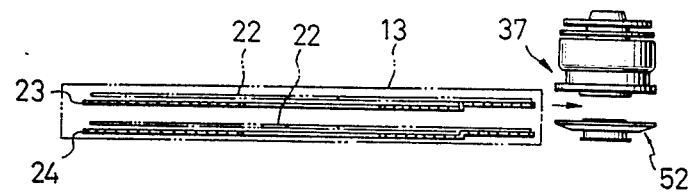
FIGS. 17 to 19 are diagrams for explaining operation of the disk player of FIG. 4.
Figure 18:
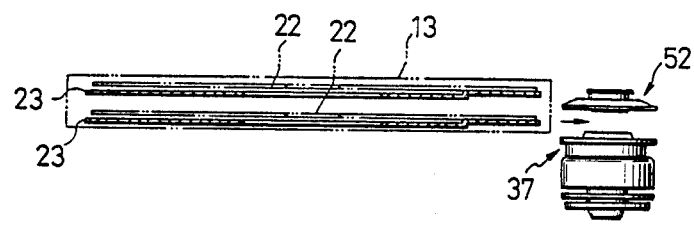
Figure 19:
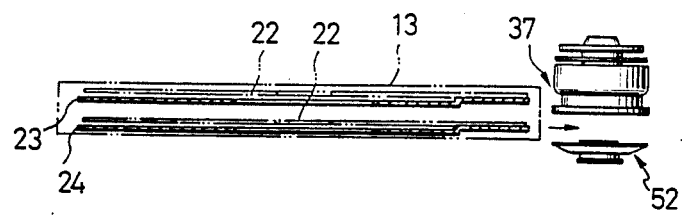
Figure 20:
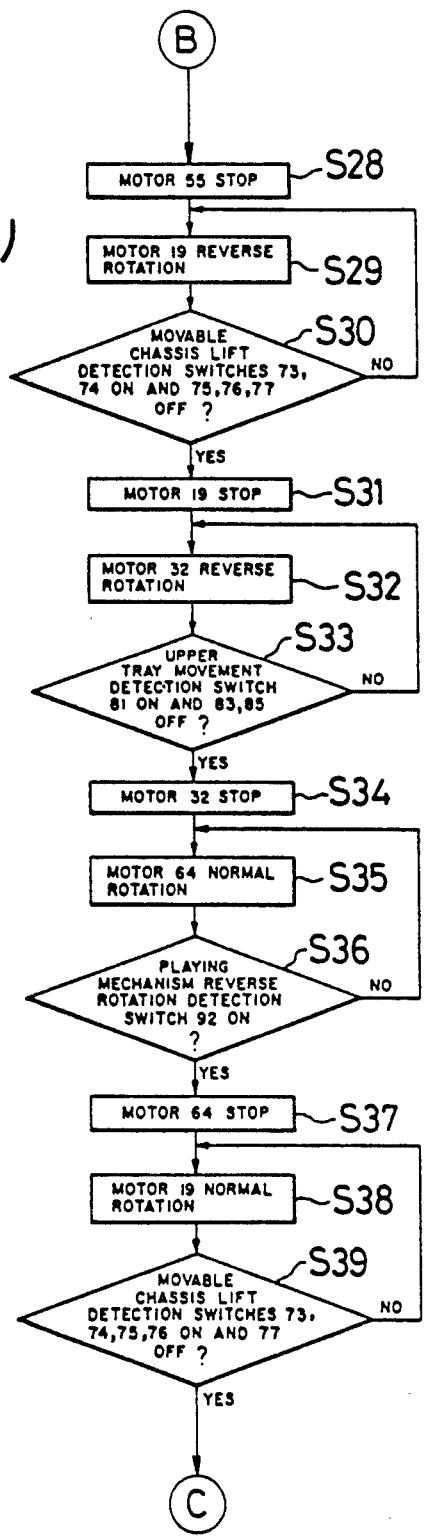
FIG. 20(a) to (f) are flowcharts for explaining the operation of the disk player of FIG. 4.
Figure 20:
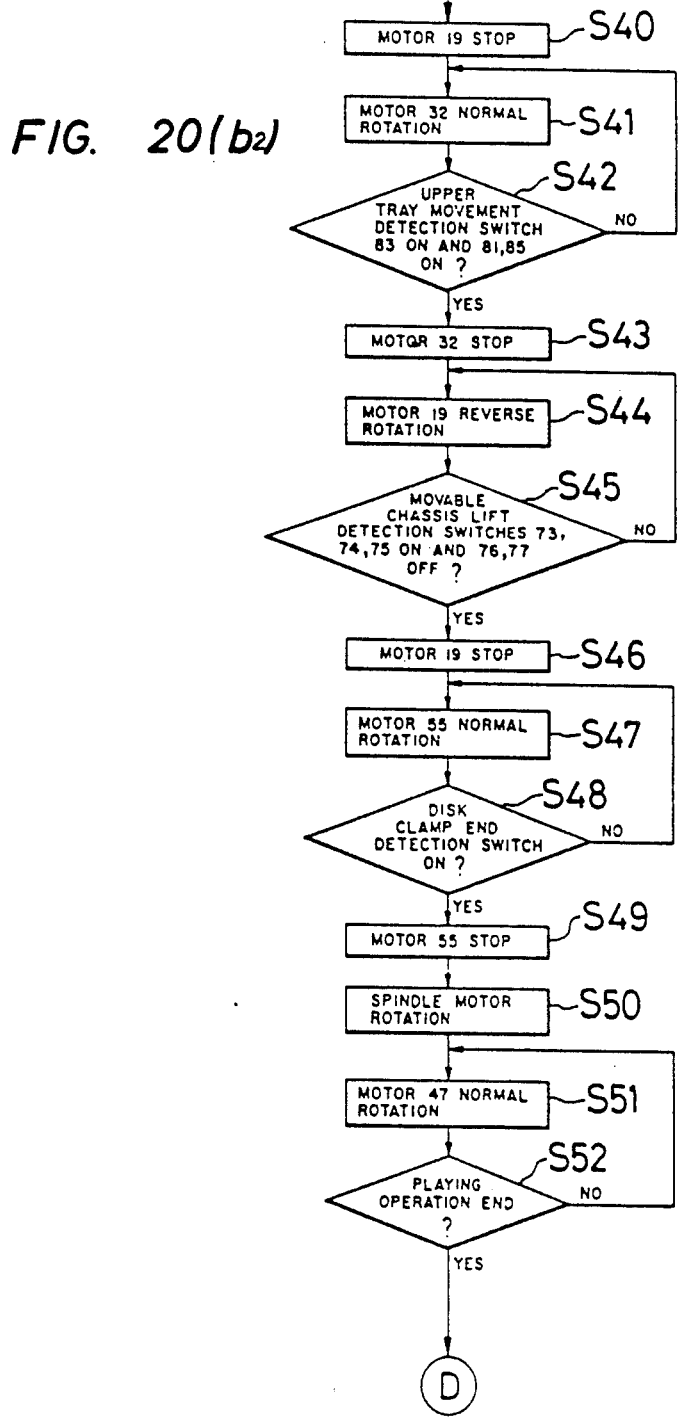
Figure 20:
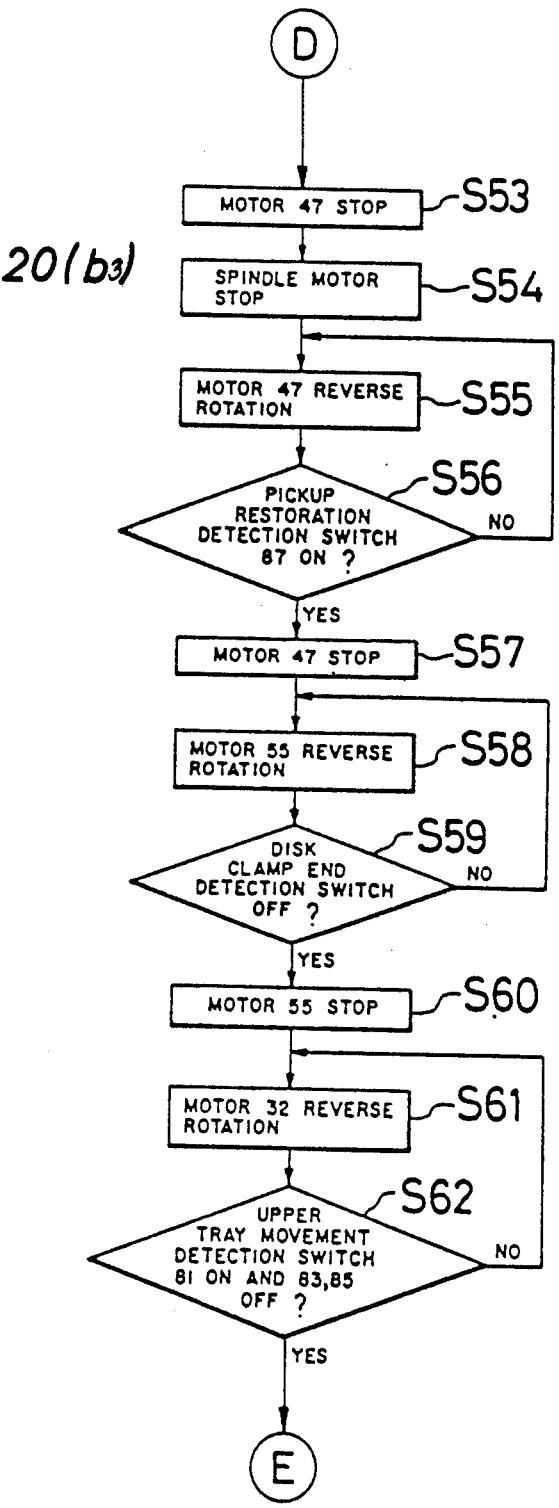
Figure 20C:
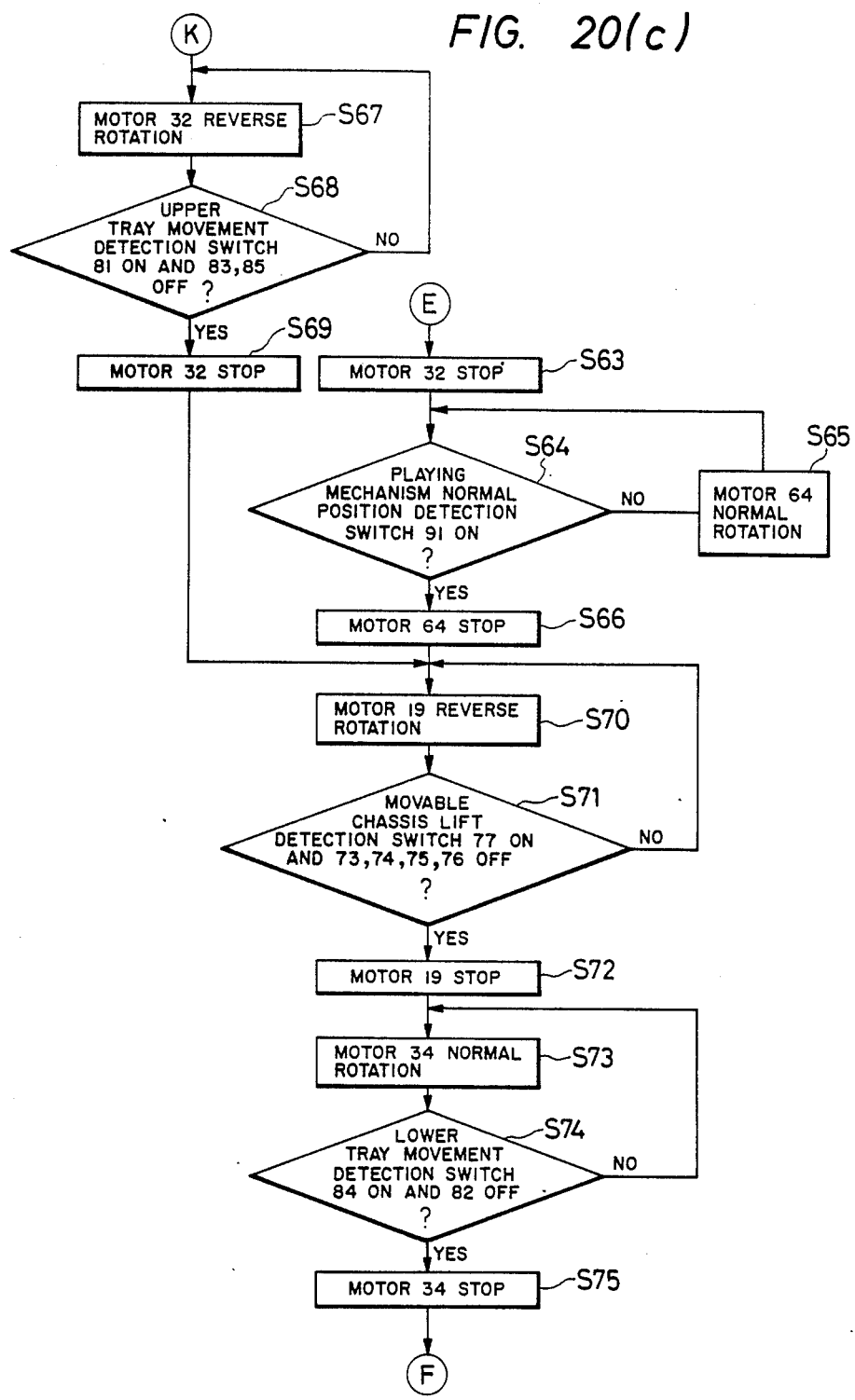
Figure 20D:
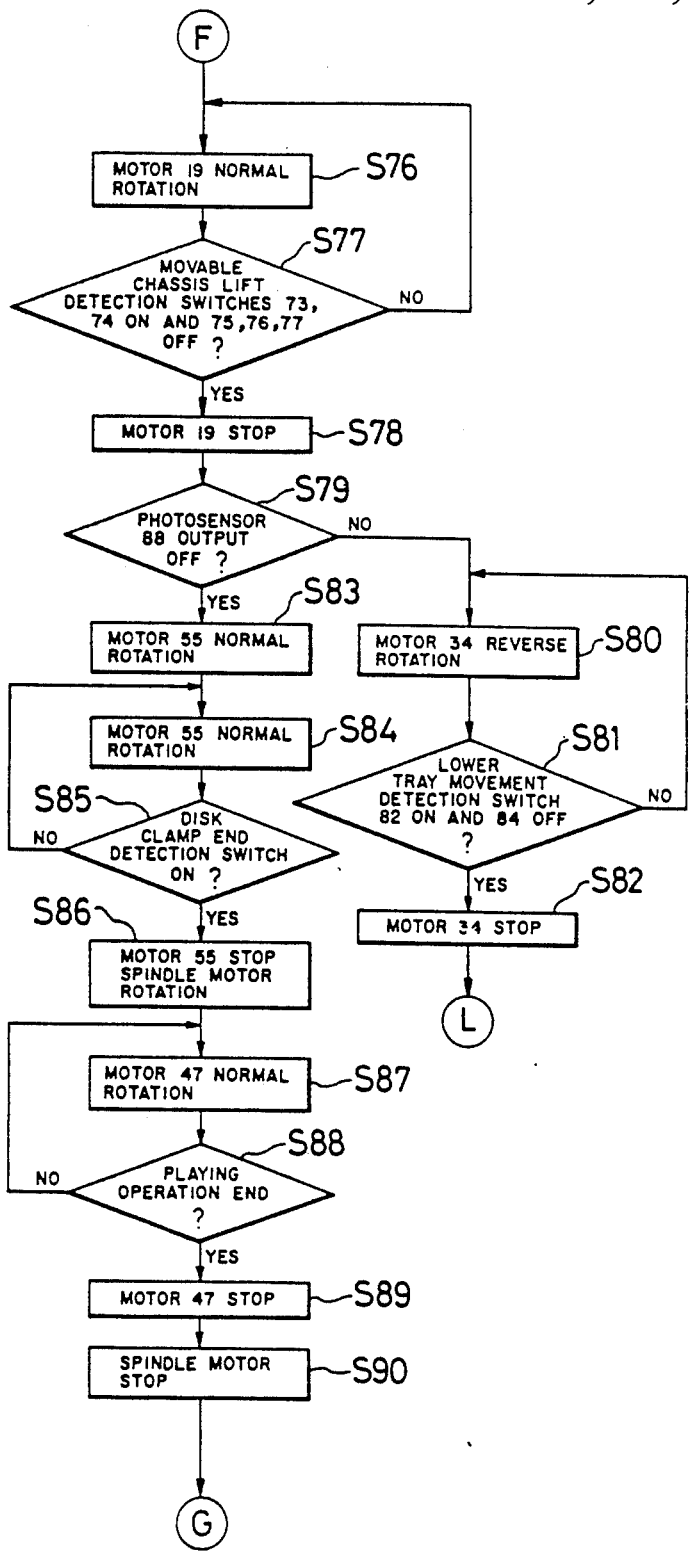
Figure 20:
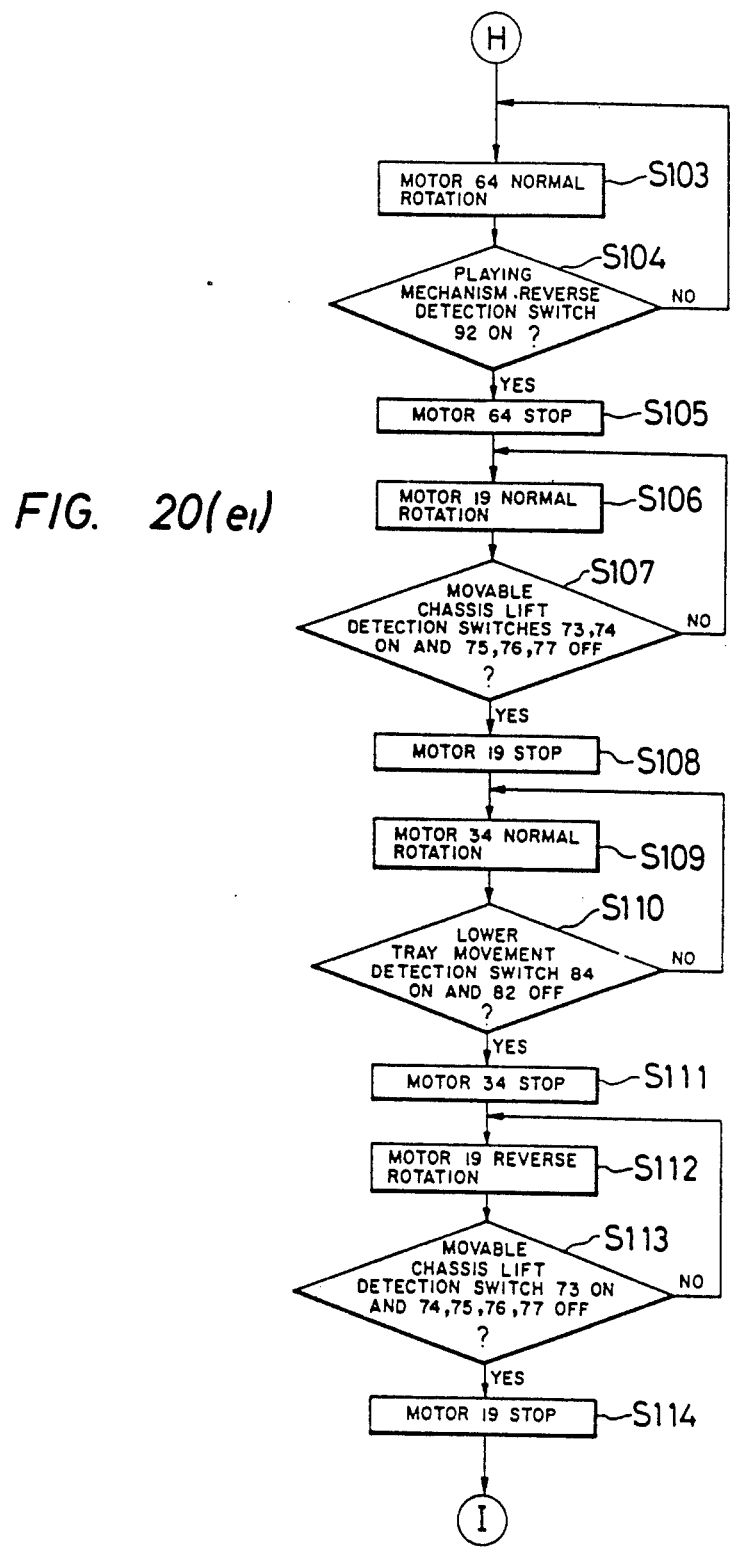
Figure 20E:
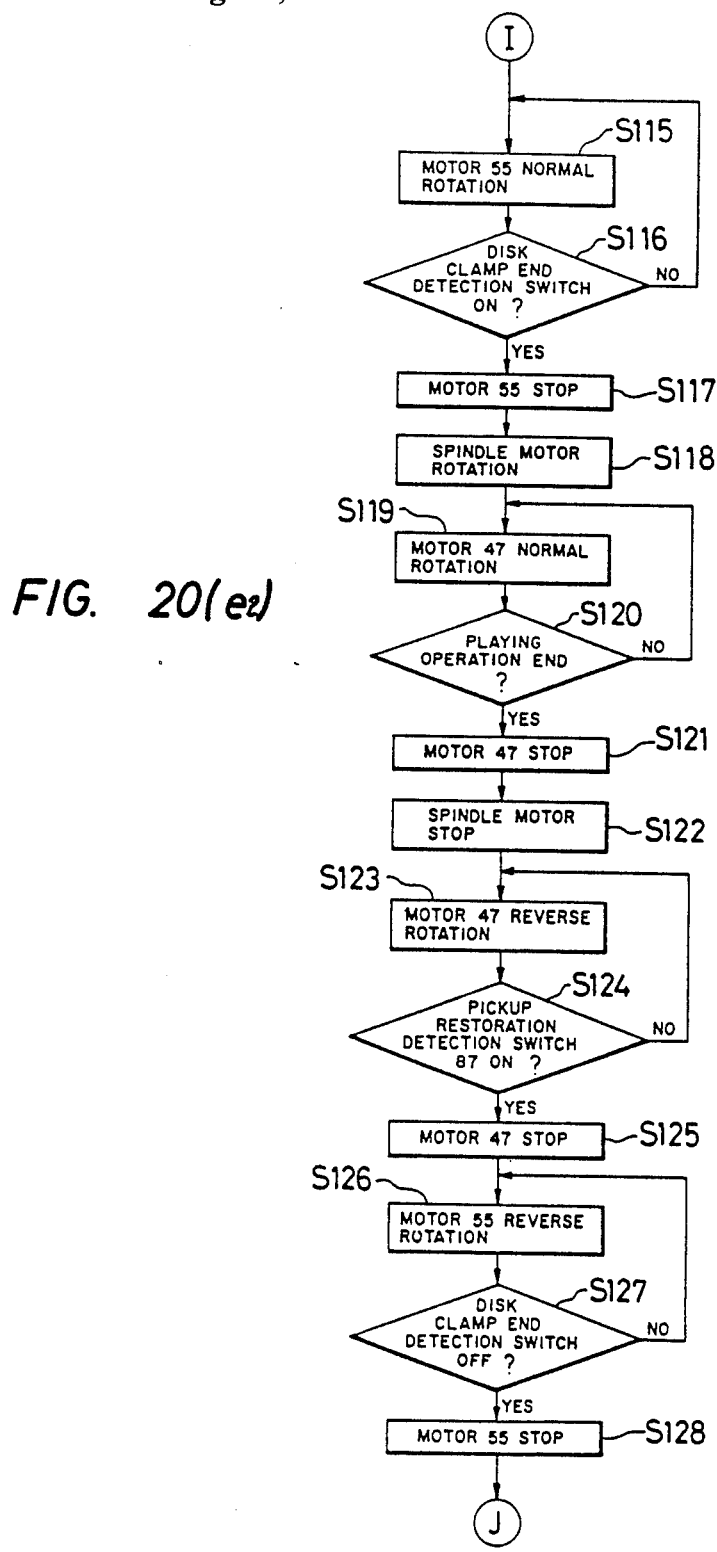
Figure 20F:
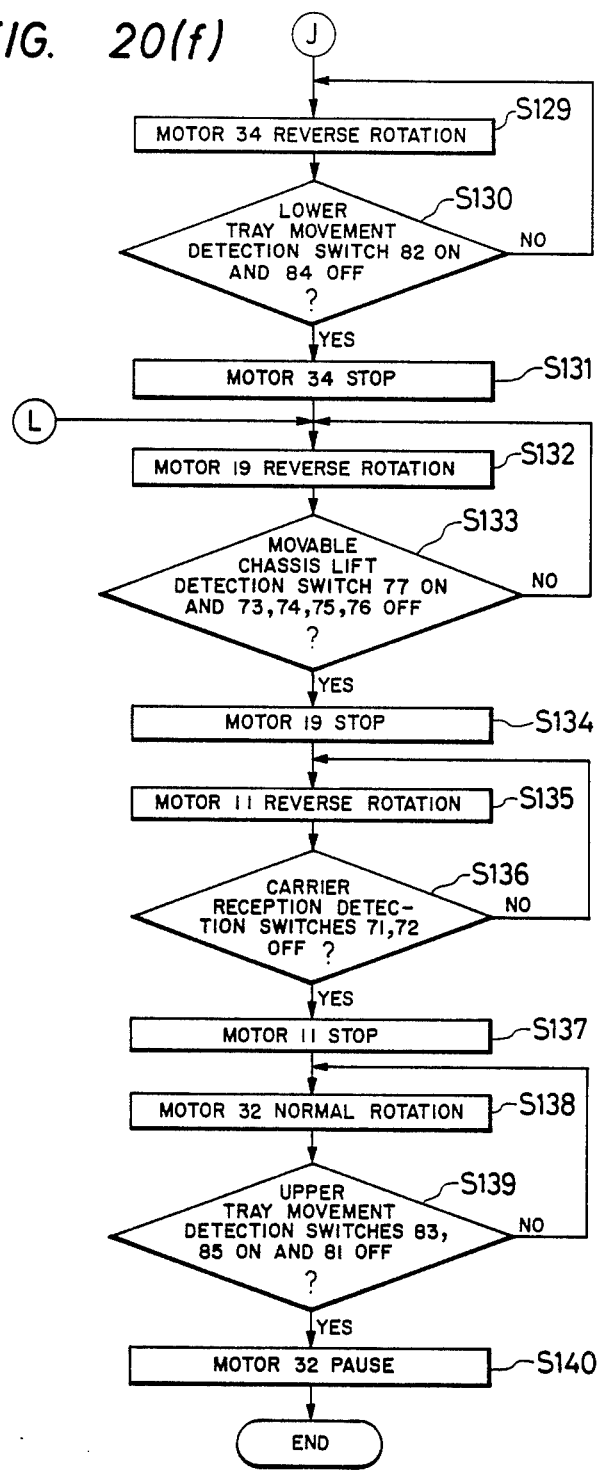

The playing mechanism is mounted on the supporting member 38 previously explained. Also, as mentioned previously, the supporting member 38 is pivotably supported by a pivoting mechanism consisting of the rotational supporting shaft 39 and bearings 40, 41. Therefore, the playing mechanism can rotatably move between a position corresponding to the lower surface of the disk 22 transferred to the playing position by the disk transfer mechanism and a position corresponding to the upper surface of the disk, as best shown in FIGS. 17-19, in order to selectively play the lower surface of the disk or the upper surface of the disk.

As further shown in FIGS. 7 and 15, the pivotably supporting axial line 38a of the supporting member 38 is parallel with the moving direction of the carriage 43 upon which the optical pickup mechanism is supported. With such structure, the space in the housing 2 is effectively utilized, as the dead space is minimized. Thereby, the disk player as a whole can be reduced in size. Moreover, the pivotably supporting axial line 38a is set at a right angle to the front and rear directions which is the disk transfer direction. Even with such structure, the player as a whole can also be reduced in size and particularly in width.

Next, a drive mechanism, which rotates the supporting member 38 which supports the playing mechanism including the turntable 37, will be explained.

As shown in FIGS. 7, 9 and 15, the rotational supporting shaft 39 erected at the left end portion of the supporting member 38 is engaged with a disk type member 61 which rotates together with the supporting member. The rotational supporting shaft 39 is also rotatably provided with a gear 62 at the left side of the disk type member 61. As can be seen from FIG. 9, pins 61a, 61b and 62a, 62b are implanted in the main surfaces of the disk type member 61 and a gear 62 and coil springs 61c and 61d are respectively extended between the pins. Namely, when the gear 62 rotates in forward (normal) or reverse, the disk type member 61 and supporting member 38 rotate through the coil springs 61c, 61d. The gear 62 is given a rotating force by a motor 64 through a double gear 63a, worm 63b, geared belt wheels 63c, 63d and geared belt 63e.

An engaging pin 38b is erected at the left side end portion of the supporting member 38 and the supporting member 38 is positioned to the normal (forward) position and reverse position when the engaging pin respectively engages with a pair of stoppers 67a, 67b fixed to the housing 2.

The drive mechanism, which rotates the supporting member 38 for loading the playing mechanism consisting of the turntable 37, etc.. is constituted by the disk type member 61, coil springs 61c, 61d, gear 62, double gear 63a, worm 63b, geared belt wheels 63c, 63d, geared belt 63e, motor 64, stoppers 67a, 67b and related peripheral small members. A playing mechanism transfer mechanism, which rotatably transfers the playing mechanism between a first playing position corresponding to the lower surface of the disk at the playing position and a second playing position corresponding to the upper surface of the disk, is constituted by the drive mechanism, supporting member 38, and pivotable supporting mechanism which includes the bearings 40, 41 and pivotably supports the supporting member 38.

The distance between the disk supporting surface of the turntable 37 when the turntable is in the first playing position for playing the lower surface of the disk (i.e. when the supporting member 38 is in the normal position) and the disk supporting surface when the turntable is in the second playing position for playing the upper surface of the disk (i.e. when the supporting member is in the reverse position) is set equal to the thickness t of the disk (FIG. 15). Moreover, as shown in FIGS. 7 and 15, the pivotably supporting axial line 38a of the supporting member 38 passes the point of intersection between the plane which passes through the center of the thickness of the disk 22 when placed on the turntable 37 and the rotational center of the turntable. With this structure, the position of the disk on the turntable becomes the same when the playing mechanism is set to either of the two playing positions.

As shown in FIG. 9, the distance between the disk supporting surfaces of the overlapped trays 23, 24 is expressed as A. As can be seen from FIGS. 11(b) and 12(b), the staircase type cam grooves 14a, 15a (formed in the movable members 14, 15 in order to intermittently move the trays in the vertical direction together with the chassis 13) are formed so that the first step movement of the chassis 13 downward is set to A which is equal to the distance between the disk supporting surfaces of the trays and the second step movement is set to an amount B. Owing to this structure it can be easily observed that the position in the vertical direction, at which each of two playing surfaces or sheets of the disks 22 transferred sequentially to the turntable 37 by the disk transfer mechanism explained earlier is positioned, can be set as the same position for the respective disks.

Detection Switches:

Thereafter, detection switches provided for purposes of detecting proper positioning of elements of the disk player are explained hereunder.

As shown in FIGS. 7 and 8, detection switches 71 and 72 are provided at the left front portion of the housing 2 to detect when the carrier is set to the projected position and receiving position when a part of the carrier 4 engages therewith.

As shown in FIG. 7, four detection switches 73, 74, 75 and 76 are provided to engage with the movable member 14 at the left rear end portion of the carrier 4. When the movable member 14 reciprocates in the front and rear directions, the movable chassis 13 supporting the trays 23, 24 reciprocates by its intermittent two step operation in the vertical direction. The detection sWitch 76 detects when the chassis 13 is at the lower stage position. The detection switch 74 detects when the chassis 13 is at the intermediate stage position, while the detection switch 75 detects when the chassis is positioned at an intermediate position with respect to the lower stage position and the intermediate stage position. The detection switch 77 is provided at the right rear end portion of the carrier 4 to engage with the other movable member 15. The detection switch 77 detects when the chassis 13 has reached the upper stage position and the detection switch 73 mentioned above detects when the chassis is positioned at an intermediate position with respect to the intermediate stage position and upper stage position. As shown in FIGS. 7 and 8, a detection switch 79, which engages with a predetermined stopper member (FIG. 8) fixed to the housing 2 and also detects that the chassis 13 has reached the upper stage position, is provided at the front end portion of the chassis 13.

At the right front end portion of the chassis 13, a pair of detection switches 81 and 82 are provided to detect that the trays are at the center of the chassis 13, i.e. at the position corresponding to the center of the carrier 4 when these engage with a part of the sheets or surfaces of the trays 23, 24. Moreover, a pair of detection switches 83, 84 provided at the right rear end portion of the chassis 13 detect that each tray is in the position protruded to the rear side of the carrier 4, i.e. in the playing position when these switches engage with a part of the trays 23, 24. At the right rear end portion of the chassis 13, another detection switch 85 is provided in the vicinity of the detection switches 83, 84. The detection switch 85 engages with the tray and operates when it protrudes backward more than the position where the upper side tray 23 protrudes backward from the carrier 4 and a part of the tray engages with the detection switch 83.

As shown in FIG. 7, a detection switch 87, provided on the supporting member 38, detects when the carriage 43 supporting the optical pickup mechanism has reached the proximity of an inner most position of an information recording region of the disk 22 and a photosensor 88, also provided on the supporting member, detects when the transferred disk 22 is loaded on the turntable 37.

As shown in FIG. 9, a bracket 90 is arranged at the left side of the supporting member 38 and supports the motor 64. The bracket 90 has a pair of detection switches 91 and 92 so that it can engage with the engaging projected portion 61f protruded to the disk type member 61 (FIG. 15) fixed to the left end portion of the supporting member. The two detection switches 91, 92 detect whether the supporting member 38 is at the normal position or reverse position, that is, the playing mechanism mounted on the supporting member is set to the first playing position corresponding to the lower surface of the disk or to the second playing position corresponding to the upper surface of the disk.

Figure 16:
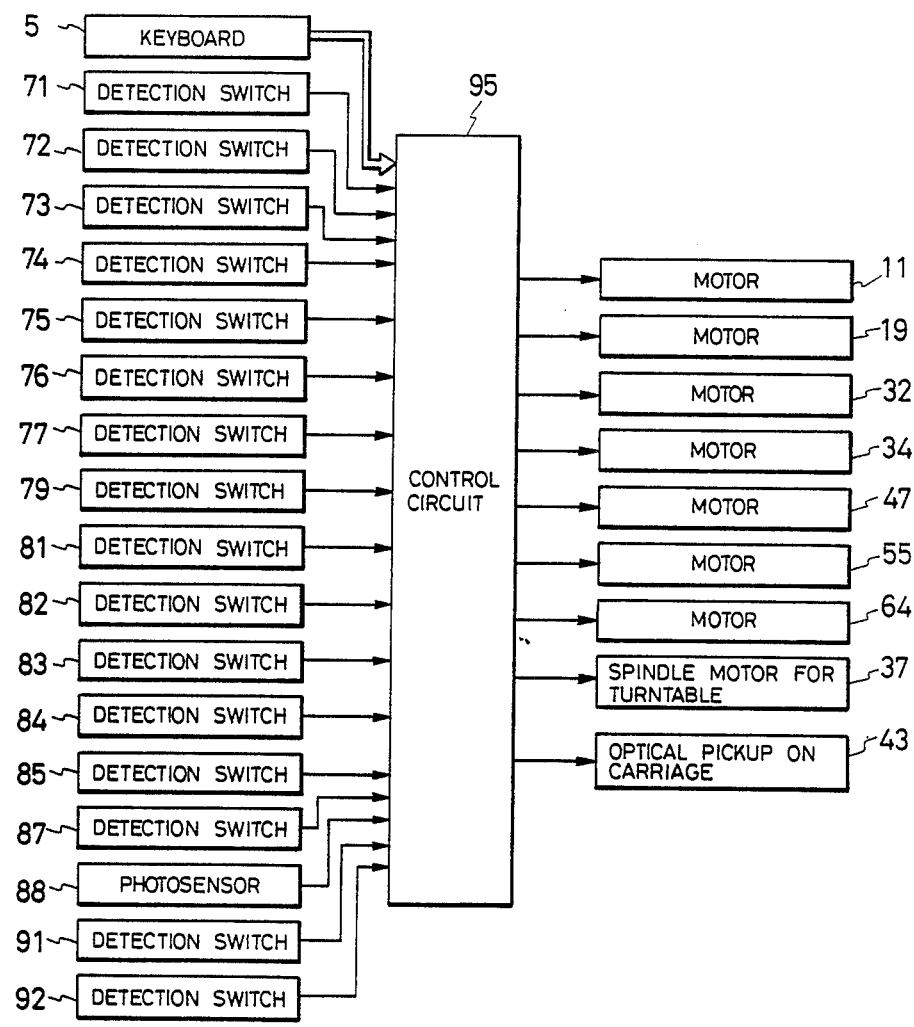
FIG. 16 is a structure of a drive control system in the disk player of FIG. 4.

The detection switches and sensors issue detection signals upon detection, and the signals are transmitted to a control circuit 95, shown in FIG. 16, and the control circuit operates the motors and pickup mechanism, the timing of which operation in accordance with the respective detection signals is explained later.

Operation:

The operation of the front loading type disk player constituted as explained above is explained for a playing operation with reference to FIGS. 17 through 20(f). Operation is also explained with reference to FIG. 16 which shows a control circuit (controller) 95, responsive to the keyboard 5, detection switches 71-77, 79, 81-85, 87, 91 and 92 and the photosensor 88, for controlling forward (normal) or reverse operation of the motors 11, 19, 32, 34, 47, 55, 64, the spindle motor for rotating the playing surface of the turntable, and the motor 43 for moving the carriage 43. Explanation of the playing operation starts from the condition where the carrier 4 is protruded outside the housing 2 as shown in FIG. 4. Under this condition, the upper tray 23 of the two trays 23, 24 is furthest protruded to the back of the carrier 4.

As shown in FIG. 4, when a disk 22 to be played is placed on the trays 23, 24 on the carrier 4 protruded outside the housing 2, the playing operation of the disk is started by operation of the keyboard 5.

As can readily be determined from FIGS. 20(a) to (f), when a disk play instruction to start the playing operation is issued in response to appropriate operation of the keyboard, the controller checks whether the playing mechanism including the turntable 37 is set to the normal position or not (step: S3). Next, the motor 11 normally rotates (step: 11) and the carrier 4 is accommodated within the housing 2 together with the two trays 23, 24 maintaining therebetween the positional relationship explained previously. Immediately before the carrier 4 reaches the receiving position, the motor 32 reversely rotates (step: S9). the upper tray 23 is moved forward (in the direction of the arrow $X_1$) as much as the specified distance from the position explained above, and the upper tray 23 is then positioned to the play position just above the turntable 37. Moreover, the lower tray 24 is positioned to the center of the carrier 4, that is, to the receiving position. Thereafter, the motor 19 normally rotates (step: S12), the trays 23, 24 are moved downward to the lower stage position from the upper stage position together with the movable chassis 13 (which supports the trays) and the disk 22 on the upper tray 23 is placed on the turntable 37 as the tray 23 passes the turntable, the tray 23 being shaped or formed with a recess or aperture sufficient to allow the tray to pass the playing mechanism, and the tray 24 is similarly formed. The motor 55 rotates normally (step: S16) and the disk is clamped to the turntable. Thereafter, the motor 47 rotates (step: S19) and thereby the carriage 43 supporting the optical pickup mechanism starts movement and the playing operation for the lower surface of the disk is initiated. When play of the lower surface of the disk is completed, disk clamp is restored (step: S27), the motor 19 reversely rotates (step: S29) and the chassis 13 moves to the intermediate position. Thereby, the disk 22 is picked up by the tray 23 from the turntable 37. The upper tray 23, once again supporting the disk 22, is returned to the position just above the carrier 4 by reverse rotation (step: S32) of the motor 32. Next, play of the upper surface of the disk 22 on the upper tray 23 is initiated as explained below.

The motor 64 rotates normally (step: S35), the playing mechanism including the turntable 37 is rotatably moved to the reverse rotational position as indicated in FIG. 17 and simultaneously the motor 19 rotates normally (step: S38) and the chassis 13 moves downward to the lower stage position. Thereafter, the motor 32 rotates normally (step: S41) to transfer the upper tray 23 to the playing position and thereby the disk 22 on the upper tray is positioned just under the turntable 37. The motor 19 then rotates (step: S44) reversely and the movable chassis 13 is lifted up to the intermediate position between the lower stage position and the intermediate stage position. Following this operation, the motor 55 rotates normally (step: S47) and the disk is clamped. Namely, when the playing mechanism for playing the upper surface of the disk 22 is positioned in the reversely rotating position, the tray 23 is once placed close to the turntable 37 together with the movable chassis 13 and thereafter the disk is clamped. When the disk is thus clamped, the play operation for the upper surface of the disk 22 is started.

When the play operation for the upper surface of the disk 22 is completed, the motor 55 rotates in reverse (step: S58) and disk clamp is restored. After the disk clamp is restored, the disk 22 is transferred onto the upper tray 23. Thereafter, the motor 32 rotates in reverse and the upper tray 23 is returned to the position just above the carrier 4.

Next, the play operation for the lower surface of the disk placed on the lower tray 24 is started.

First, as shown in FIG. 18, the controller checks whether the playing mechanism is returned to the normal position or not (step: S64). Next, the motor 19 rotates reversely (step: S70) and the chassis 13 lifts up to the upper stage position. Under this condition, the motor 34 rotates normally (step: S73) and thereby the lower tray 24 is moved to the playing position just above the turntable 37. Thereafter, the motor 19 rotates normally (step: S76) so that the chassis 13 is moved downward to the intermediate stage position, and the disk 22 on the lower tray 24 is loaded on the turntable 37. The motor 55 then rotates normally (step: S83), and disk clamp is carried out. Simultaneously, the motor 47 rotates normally (step: S87) so that the carriage 43 starts to move and the play operation for the lower surface of the disk 22 is carried out. When the play operation for lower surface of the disk 22 is completed, the disk clamp is restored, the motor 19 rotates reversely (step: S97) and the chassis 13 is lifted up to the upper stage position (step: S98). When the chassis 13 moves upward, the disk 22 on the turntable 37 is transferred to the lower tray 24. The motor 34 rotates reversely (step: S100) and the lower tray 24 supporting the disk 22 once again is returned to the position just above the carrier 4.

Next, the play operation for the upper surface of the disk on the lower tray 24 is conducted.

The motor 64 rotates normally (step: S103), so that the play mechanism including the turntable 37 is rotatably moved to the reverse position and simultaneously the motor 19 rotates normally (step: S106) so that the chassis 13 moves downward to the intermediate stage position. Thereafter, the motor 34 rotates normally (step: S109) and the lower tray 24 moves to the position just above the turntable 37. In succession, the motor 19 rotates reversely (step: S112) and the chassis 13 lifts up to the intermediate position between the upper stage position and the intermediate stage position. The motor 55 rotates normally (step: S115), the disk is clamped, the spindle motor rotates (step: S118) and the carriage 43 moves due to the rotation of the motor 47 (step: S119) to start the play operation of the upper surface of the disk 22.

When the play operation for the upper surface of the disk is completed the motor 55 rotates reversely (step: S126) and the disk clamp is restored. With the restoration of the disk clamp, the disk is returned to the lower tray 24. Thereafter, the motor 34 rotates reversely and the lower tray 24 is moved to the position just above the carrier 4.

When the play operation for both sides of two disks is completed, the motor 19 rotates reversely (step: S132) and the chassis 13 supporting the trays 23, 24 is moved to the upper stage position. Thereafter, the motor 11 rotates reversely (step: S135) and the carrier 4 is protruded toward the outside of housing together with the chassis 13 and trays 23, 24. With this operation, the motor 32 rotates normally (step: S138), so that only the upper tray 23 moves backward and it is set to the condition shown in FIG. 4.

In the embodiment of the present invention, only one carrier 4 is provided to support a plurality of trays 23, 24, but it is also possible to provide individual carriers for the trays 23 and 24. However, the number of parts can be reduced through the common use of carriers for a plurality of trays. Moreover, structure can be simplified and size reduction and cost reduction can be realized easily for the disk player as a whole. In addition additional trays can be provided, or only one tray.

As explained previously, the front loading type disk player of the present invention allows the tray, which is provided on the carrier and which carrier is movable in the first predetermined direction with respect to the housing, for supporting the disk to move freely with respect to the carrier in both the first predetermined direction and the second predetermined direction, which is for example, at a right angle to such first direction.

Owing to such structure, it is also possible to prepare another position for movement of the tray at the deepest position of the housing, in addition to the two positions (protruded position and receiving position) with respect to the housing. Therefore, the play operation for both sides of the disk and for multiple disks can be realized without ejecting the disk by providing a pair of pickup mechanisms in such a way as to sandwich the disk supported on the tray in the playing position or by providing one movable pickup mechanism for playing both sides of the disk.

In the front loading type disk player of the present invention, the number of operations or movements of the carrier and trays can be made small individually because movement of the disk between the three positions of the protruded position, receiving position and playing position is realized by the relative movement of the carrier and tray, and as a result, any enlargement of the player as a whole may be minimized. Moreover, in addition to the above-described movements of the chassis, carrier, tray and other components, and the sequence of the movements, other movements and sequences will be readily apparent to those of ordinary skill in the art.

An inventive disk player for receiving and selectively playing multiple disks, according to a different embodiment of the invention, will be explained with reference to FIGS. 21 and 22.

Figure 1:
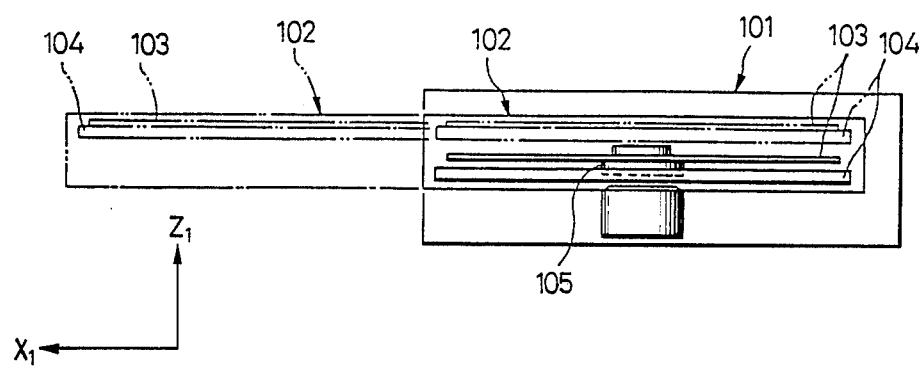
FIG. 1 indicates an essential part of a proposed front loading type disk player.
Figure 2:
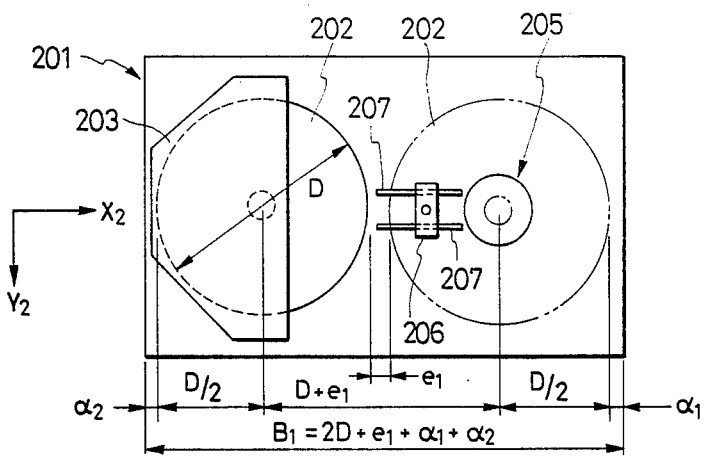
FIGS. 2 and 3 are diagrams for explaining a proposed disk player.
Figure 3:
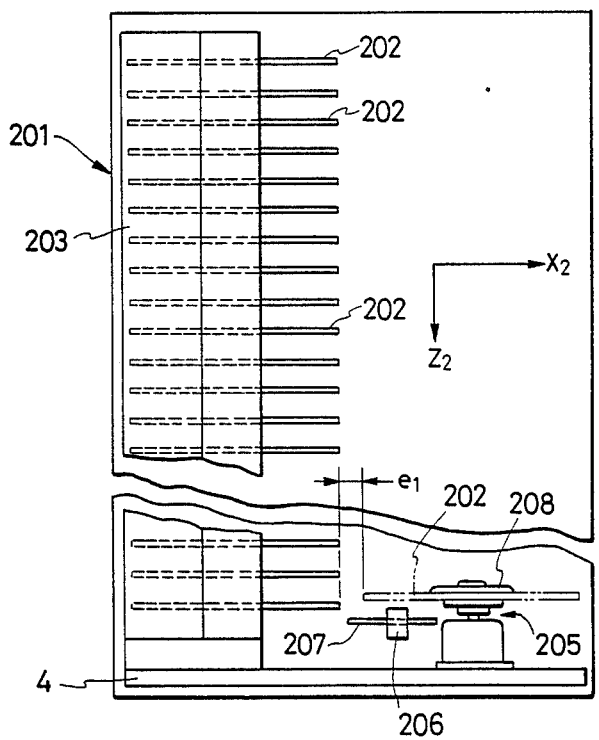

The disk player of this different embodiment of the present invention is formed almost similar to the disk player indicated in FIGS. 2 and 3, so in FIGS. 21 and 22, like parts or those corresponding to that in the disk player indicated in FIGS. 2 and 3 are given like reference symbols in the following explanation.

Figure 21:
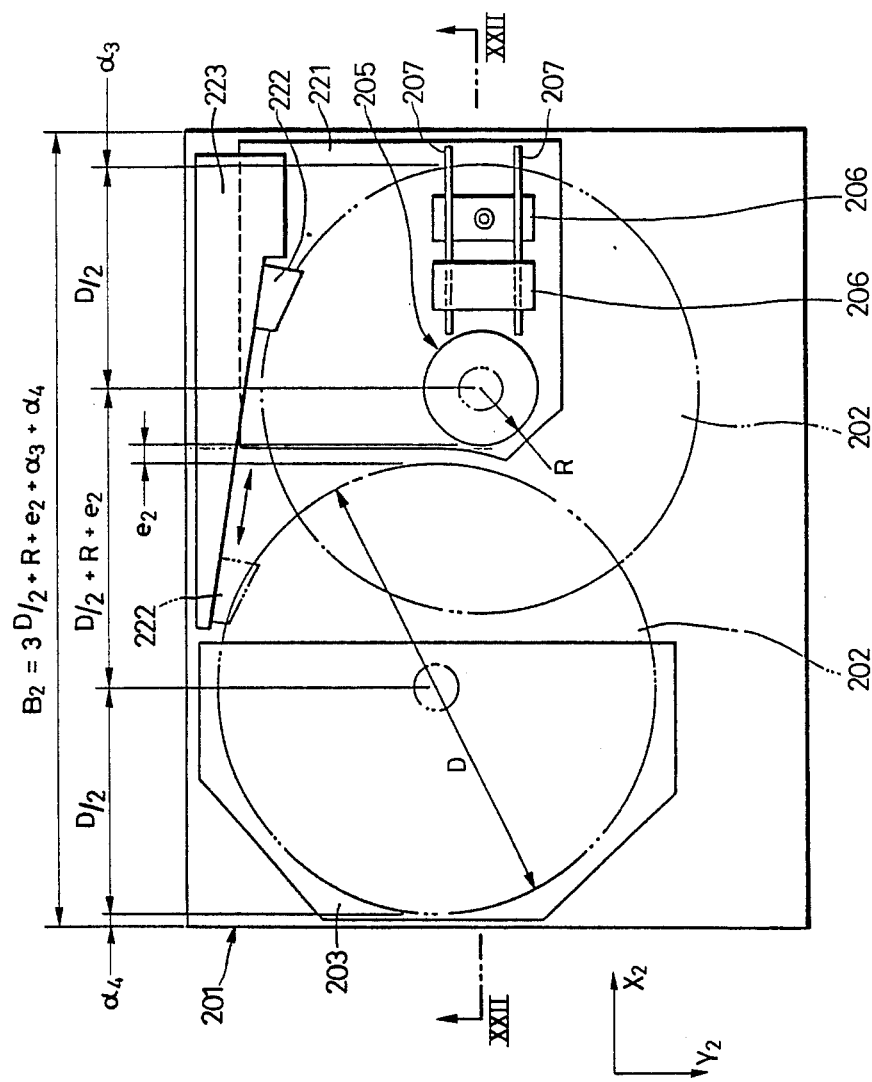
FIG. 21 a plan view of internal structure of a disk player in a different embodiment of the present invention.
Figure 22:
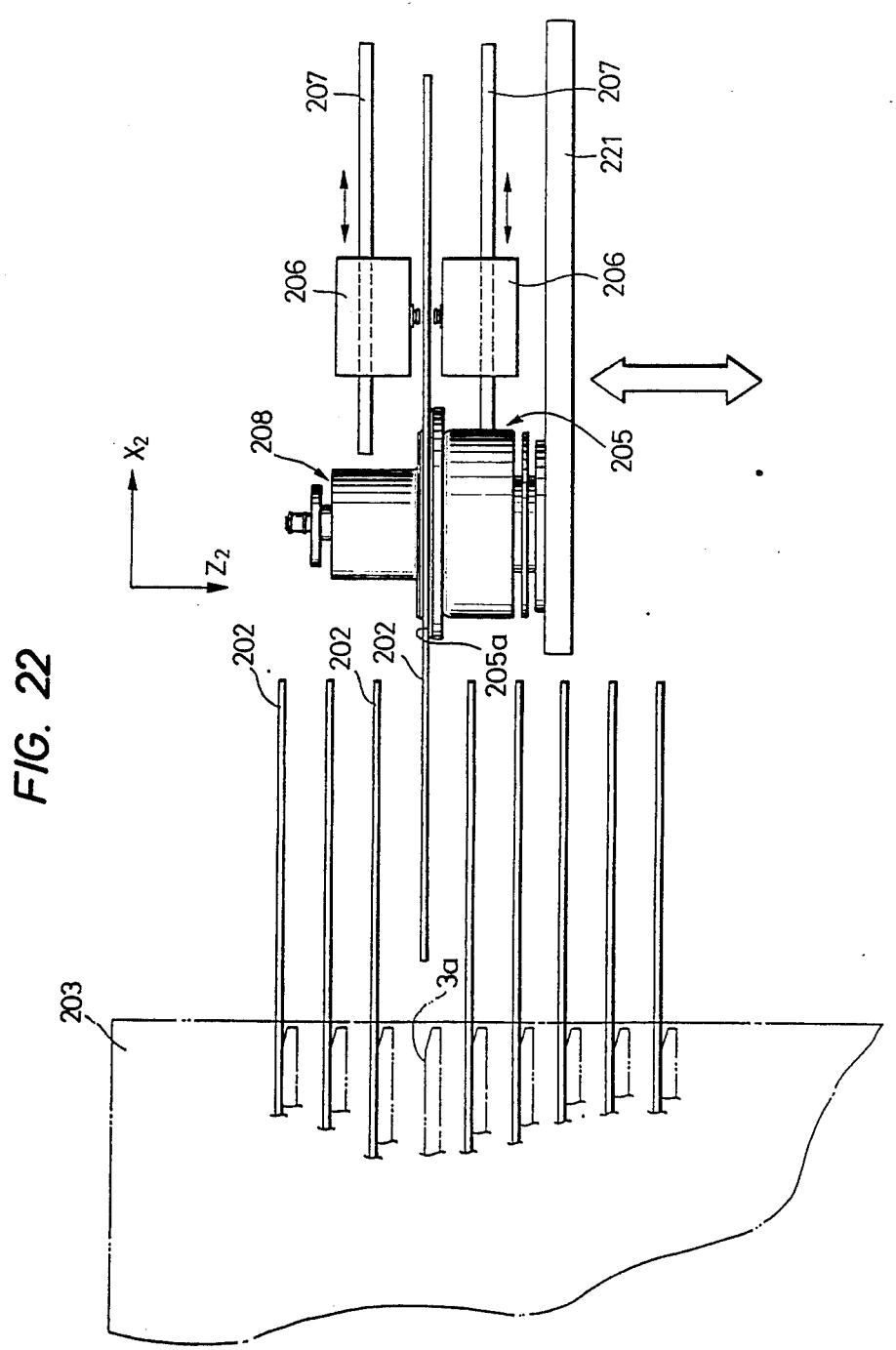
FIG. 22 is a sectional view taken along the line XXII—XXII of the disk player of FIG. 21.

As indicated in FIGS. 21 and 22, the disk player of the present invention provides a movable base member 221 which can freely move in the vertical direction (direction $Z_2$ and its reverse direction), namely in the axial direction of a stock of disks 202 and a drive means (not illustrated) which drives the movable base member. The turntable 205, carriage 206 and guide shaft 207 and clamper 208 are all mounted on the movable base member 221. As indicated in FIG. 21, the rear end part of the base member 221 is provided with a disk holding part 222 which holds the disk 202 and a drive mechanism 23 which moves the disk holding part substantially in a horizontal direction (direction $X_2$ and its reverse direction) with the disk 202 held in the holding part. The disk is moved linearly between the disk receptor 203 and the turntable 205 by the disk holding part 222 and the drive mechanism 223. Therefore, the disk holding plane 205a (FIG. 22) of the turntable 205 becomes parallel with the receiving plane 203a (indicated in FIG. 21) of the disk receptor 203.

As shown in FIG. 21, the separation distance between the position on the disk receiving plane 203a (the reference number is indicated in FIG. 22) corresponding to the center of the disks stored in the disk receptor and the rotational center axis of the turntable 205 is equal to $D/2+R+e_2$, where D is the diameter of disk 202. R is the radius of the turntable 205 and $e_2$ is the clearance in the horizontal plane (including the direction of arrow $X_2$ and the direction of arrow $Y_2$) provided between the disk on the disk receptor 203 and the external circumference of the turntable. Moreover, the separation distance $D/2+R+e_2$ is set substantially smaller than the diameter D of the disk. Thereby, the disks in the disk receptor 203 and a disk 202 on the turntable 205 are partly overlapped within the horizontal plane.

Therefore, the width $B_2$ of the housing 1 is equal to $3D/2+R+e_2+a_3+a_4$, which is obtained by adding $2\times D/2+a_3+a_4$ to the separation distance $D/2+R+e_2$, where $a_3$ and $a_4$ indicate the allowable distance of separation between the disk and the internal surface of the housing 201.

Subtraction of the width $B_2$ of the disk player of the present invention from the width $B_1$ of the proposed disk player indicated in FIGS. 2-3, results in a value. $D/2-R$. Namely, the width of the disk player of this embodiment of the present invention can be made smaller than that of the proposed disk player by setting the radius R of the turntable 205 smaller than the radius $D/2$ of the disk. In actuality, the radius R of the turntable is sufficiently smaller than the radius $D/2$ of the disk and the width can be reduced remarkably.

Next, operation of the inventive disk player described above will be explained.

When a disk to be played is designated by conventional means, the movable base member 221 is moved until the position where the disk holding part 222 is capable of holding the designated disk. Thereafter, the disk holding part 222 is moved up to the position indicated by the chain line using the drive mechanism 223 and the designated disk is then grasped by the disk holding part 222. Under this condition, the disk holding part 222 is moved up to the position indicated by a solid line (FIG. 21) and the designated disk is positioned on the turntable 205. The clamper 208 (FIG. 22) moves downward, the disk 202 is clamped to the turntable 205 and simultaneously the holding condition of the disk by the disk holding part 222 is restored. Thus, a playing operation can be initiated by operating the turntable 205 and carriage 206.

When the playing operation ends, the disk is returned to its initial receiving position in the disk receptor 203 by reversing the process described above for moving the disk from the disk receptor to the turntable. Thereafter, the processes and operations explained above are repeated in accordance with the number of disks designated for play by a user.

In the disk player of the present invention, two carriages 206 holding the pickup mechanism for performing the playing operation of both sides of the disk are provided corresponding to both sides of the disk 202, but it is also possible to provide only one carriage for playing only a single side. Moreover, one carriage can also be moved corresponding to both sides of the disk 202 and thus both sides can be played only with one carriage.

As explained previously in detail, in the disk player of the present invention, the disk holding plane of the turntable is parallel to the disk receiving plane of the disk receptor, and the separation distance between the position on the disk receiving plane corresponding to the center of disk and the rotational center axis of the turntable is larger than a sum of respective radii of the disk and the turntable and is less than the diameter of the disk. Namely, the device is structured such that the disk playing operation can be performed under the condition that the disks in the disk receptor and on the turntable are partly overlapped.

Therefore, the width of the housing enclosing the playing means including the turntable and the disk receptor can be greatly decreased, creating a significant reduction in the size of the apparatus as a whole.

What is claimed is:

1. A disk player for playing first and second sides of at least one disk, said disk player comprising:
    (a) a compact housing having an opening therein;
    (b) means in said housing for supporting the disk on one of its first and second sides when the disk is placed in said housing;
    (c) reproducing means in said housing for playing the first side of the disk when said reproducing means is in a first position and the disk is in a playing position, and for playing the second side of the disk when said reproducing means is in a second position and the disk is in the playing position; and
    (d) means for transferring the disk from the means for supporting to the playing position on the means for playing the disk, wherein said disk player further comprises carrier means movable in first and second opposite directions with respect to said housing between a first position wherein said carrier protrudes outside of said housing through said opening and a second position wherein said carrier is retracted so as to be disposed within said housing, said means for supporting the disk being mounted on said means for transferring the disk for independent movement, in said first and second directions, with respect to said means for transferring the disk and said carrier means.

2. A disk player as claimed in claim 1, wherein said means for transferring comprises means for moving said means for supporting, independently of said carrier means, in the first and second opposite directions between third and fourth positions with respect to said carrier means.

3. A disk player as claimed in claim 2, wherein said means for transferring further comprises means for moving said means for supporting in third and fourth opposite directions with respect to said carrier means, wherein said third and fourth directions are transverse to said first and second directions.

4. A disk player as claimed in claim 1, wherein said means for playing is selectively movable between a first position for playing the first side of the disk and a second position for playing the second side of the disk.

5. A disk player for playing first and second sides of first and second disks, said disk player comprising:

(a) a compact housing having an opening therein;
(b) first tray means in said housing for supporting the first disk on one of its first and second sides when the disk is placed in said housing;
(c) second tray means in said housing for supporting the second disk on one of its first and second sides when the second disk is placed in said housing;
(d) reproducing means in said housing for playing the first side of either of the first and second disks when said reproducing means is in a first position and for playing the second side of either of the first and second disks when said reproducing means is in a second position; and
(e) means for selectively transferring the first and second disks from a respective one of said first and second tray means to said means for playing, said first and second tray means each being independently movable between a first position wherein a corresponding said tray means protrudes outside of said housing through said opening and a second position wherein a corresponding said tray means is retracted so as to be disposed within said housing.

6. A disk player as claimed in claim 5, further comprising means for selectively moving said reproducing means between said first and second positions.

7. A disk player as recited in claim 6, wherein said reproducing means plays said first or second sides when the disk at said reproducing means is disposed in a playing position and supported on a disk supporting surface of said reproducing means.

8. A disk player as recited in claim 7, wherein said reproducing means includes means for clamping the disk in the playing position.

9. A disk layer as claimed in claim 7, wherein said disk supporting surface of said reproducing means when said reproducing means is in said first position is at a distance from said disk supporting surface when said reproducing means is in said second position which corresponds to a thickness of either of said first and second disks.

10. A disk player as claimed in claim 6, wherein said disk player further comprises carrier means movable in first and second opposite directions between first and second positions with respect to said housing, said first and second tray means being mounted for movement with said carrier means.

11. A disk player as claimed in claim 10, wherein said means for transferring comprises means for moving said first and second tray means, independently of said carrier means, in the first and second opposite directions between third and fourth positions with respect to said carrier means.

12. A disk player as claimed in claim 11, wherein said means for transferring further comprises means for moving said first and second tray means in third and fourth opposite directions with respect to said carrier means, wherein said third and fourth directions are transverse to said first and second directions.

13. A disk player as claimed in claim 12, wherein said means for moving said tray means is movable between fifth, sixth and seventh positions, wherein said sixth position is between said fifth and seventh positions.

14. A disk player as recited in claim 13, wherein said first and second tray means have disk supporting surfaces for supporting the respective first sides of said first and second disks, and said disk supporting surfaces overlap each other when said first and second tray means are in said third position with respect to said carrier means.

15. A disk player as claimed in claim 14, wherein said reproducing means includes a disk supporting surface for supporting one side of either of said first and second disks when the other side of either of said first and second disks is being played, and said supporting surfaces of said first and second tray means overlap said supporting surface of said reproducing means when said first and second tray means are in said fourth position with respect to said carrier means.

16. A disk player as recited in claim 10, wherein said housing has a front end and a rear end opposite the front end, and said carrier means projects outside of said front end of said housing through said opening when in said first position, and said carrier means is disposed inside of said housing when in said second position.

17. A disk player as claimed in claim 7, wherein a disk supporting surface of said reproducing means when said reproducing means is in said first position is at a separation distance from said disk supporting surface of said reproducing means when said reproducing means is in said second position.

18. A disk player as claimed in claim 16, wherein said reproducing means is disposed at the rear end of said housing.

19. A disk player comprising:
(a) a compact housing having an opening therein;
(b) a carrier (4) movable in first and second opposite directions with respect to said housing between a first position wherein said carrier protrudes outside of said housing through said opening and a second position wherein said carrier is retracted so as to be disposed within said housing;
(c) a chassis (113) mounted in said carrier for movement in third and fourth directions with respect to said carrier, said third and fourth opposite directions being transverse to said first and second directions;
(d) a first tray (23) and a second tray (24) mounted on said chassis for independent movement, in said first and second directions, with respect to each other and said chassis between a third position and a fourth position, each of said first and second trays being adapted for supporting at least one disk;
(e) means in said housing for playing a side of a disk which is in a playing position; and
(f) mans for controlling movement of said carrier, said first and second trays, and said chassis, for selectively transferring the disk mounted on said first tray and the disk mounted on said secondary to said playing position with either side of said disk being disposed for play.

20. A disk player as claimed in claim 19, wherein said means for playing is rotatable between a first position for playing one side and a second position for playing the other side of the disk in said playing position.

21. A disk player as claimed in claim 19, wherein said means for playing includes means for clamping said disk to said playing position.

22. A disk player as claimed in claim 20, further comprising means for detecting respective positions of said chassis, said carrier, said first and second tray means, and said means for playing, and outputting respective detection signals. and wherein said means for controlling is responsive to said detection signals.

23. A disk player as claimed in claim 19, wherein said carrier is formed with a single member.

24. A disk player as claimed in claim 19, wherein said means for playing comprises a turntable having a disk supporting surface for supporting a disk in said playing position, and wherein said chassis is in said second position and one of said first and second trays is in said fourth position, a central axis of the disk supported in said tray is coaxial with a central axis of said turntable.

25. A disk player as claimed in claim 24, wherein the disk on the one of said trays in said fourth position is transferred to said turntable in response to movement of said chassis in at least one of said third and fourth directions.

26. A disk player as claimed in claim 25, wherein said first and second tray means have respective apertures formed therein sized and positioned so that the one of said first and second trays in said fourth position clears said turntable when said chassis moves in at least one of said third and fourth directions.

27. A disk player as claimed in claim 19, wherein said chassis is stepwise movable by a first distance in said third and fourth directions, and wherein said first and second trays respectively include first and second supporting surfaces for supporting said first and second disks, said first and second supporting surfaces being disposed at a second distance from each other with respect to said third and fourth directions, and said first and second distances being equal.

* * * * *